United States Patent
Lucas et al.

(10) Patent No.: US 11,500,859 B2
(45) Date of Patent: Nov. 15, 2022

(54) SYSTEM AND METHOD FOR PROPAGATING MODIFICATIONS IN FLOWS

(71) Applicant: salesforce.com, inc., San Francisco, CA (US)

(72) Inventors: Paul Lucas, Sydney (AU); Derrick Vuong, Sydney (AU); Jiun Ryu, Sydney (AU); Elly Yijun Zhu, Sydney (AU)

(73) Assignee: Salesforce, Inc., San Francisco, CA (US)

( * ) Notice: Subject to any disclaimer, the term of this patent is extended or adjusted under 35 U.S.C. 154(b) by 70 days.

(21) Appl. No.: 17/006,308

(22) Filed: Aug. 28, 2020

(65) Prior Publication Data
US 2021/0141783 A1     May 13, 2021

Related U.S. Application Data

(60) Provisional application No. 62/934,775, filed on Nov. 13, 2019.

(51) Int. Cl.
*G06F 16/23* (2019.01)
*G06F 16/245* (2019.01)
*G06Q 10/10* (2012.01)

(52) U.S. Cl.
CPC ...... *G06F 16/2379* (2019.01); *G06F 16/2365* (2019.01); *G06F 16/245* (2019.01); *G06Q 10/10* (2013.01)

(58) Field of Classification Search
CPC ............. G06F 16/2365; G06F 16/2379; G06F 16/245; G06F 16/9024; G06F 8/433; G06Q 10/06; G06Q 10/067
See application file for complete search history.

(56) References Cited

U.S. PATENT DOCUMENTS

| | | | |
|---|---|---|---|
| 2002/0188597 A1* | 12/2002 | Kern | G06Q 30/06 |
| 2005/0004888 A1* | 1/2005 | McGrady | G06F 16/284 |
| 2017/0161347 A1* | 6/2017 | Raza | H04L 67/62 |
| 2017/0366637 A1* | 12/2017 | Bandyopadhyay | H04L 67/5682 |
| 2021/0132757 A1* | 5/2021 | Golub | G06F 16/90335 |

* cited by examiner

*Primary Examiner* — James E Richardson
(74) *Attorney, Agent, or Firm* — Sterne, Kessler, Goldstein & Fox P.L.L.C.

(57) ABSTRACT

Described herein is a system and method for propagating modifications in flows. In an embodiment, a central system activates a master process (e.g., master flow), including a sub-process (e.g., sub-flow) and a pre-programmed object (e.g., component). The master process is configured to execute a task using the sub-process and pre-programmed object. The central system initializes a variable corresponding to the master process. The central system further identifies a metadata object using the variable. The metadata object defines a runtime configuration of the master process and sub-process. The central system receives a modification to a setting of the metadata object and propagates the modification of setting in the metadata object to the master process and sub-process.

18 Claims, 25 Drawing Sheets

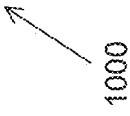

FIG. 10

| Custom Fields | | | |
|---|---|---|---|
| | | | [New] |
| Action | Field Label | API Name | Data Type |
| Edit | Boolean Value | qsydApps_AQ_Boolean_Value_c | Checkbox |
| Edit | Configuration Name | qsydApps_AQ_Configuration_Name_c | Text(255) |
| Edit | Date Time Value | qsydApps_AQ_Date_Time_Value_c | Date/Time |
| Edit | Date Value | qsydApps_AQ_Date_Value_c | Date |
| Edit | Flow API Name | qsydApps_AQ_Flow_API_Name_c | Text(255) |
| Edit | Number Value | qsydApps_AQ_Number_Value | Number(16, 2) |
| Edit | Text Value | qsydApps_AQ_Text_Value | Text(255) |

Flow Letterhead Setting Edit

Information

| | |
|---|---|
| Label | Default |
| Flow Letterhead Setting Name | Default |
| Active | ✓ |
| Logo image url | /resource/qsydApps_AO |
| Background color | rgba (255, 255, 255, 0.3) |
| Background image url | https://developer.salesf |
| Headline | Headline |
| Logo height(px) | 60 |
| Font size | 20.0 |
| Padding style | small |
| Font color | #333333 |
| Horizontal Alignment | center |
| Background repeat | no-repeat |
| Background size | cover |
| Background position | center center |
| Height (px) | 115 |
| Vertical Alignment | middle |

[Save] [Save & New] [Cancel]

SYSTEM AND METHOD FOR PROPAGATING MODIFICATIONS IN FLOWS

CROSS-REFERENCE TO RELATED APPLICATIONS

This application claims priority to U.S. Provisional Application No. 62/934,775 filed on Nov. 13, 2019, the contents of which are incorporated herein in their entirety.

BACKGROUND

Entities such as retailers and corporations may use digital interfaces for performing various actions such as logging into their system, purchasing products, making modifications to reservations, paying bills, or the like. Each of these digital interfaces may require sequential flows, including graphical user interfaces, siloed data, and complex logic. Furthermore, changing the digital interfaces may be cumbersome as the changes may need to be propagated throughout the sequential flows. If the changes are not propagated throughout the digital flows, the digital interfaces may not function correctly. This can cause a frustrating experience for users, costly delays, and lost opportunities for the entities. Existing tools may require entities to create a new version of said flow, apply the modification, effectively mutating the flow source definition, activate the new version, and deploy to new flow version to production. This can be very slow and error-prone. Additionally, this may be very computationally expensive.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 10 illustrates a metadata object custom fields according to an example embodiment.

FIG. 11 is an example user interface for modifying a code generator for an apex action according to an example embodiment.

FIG. 13 is an example document upload component according to an example embodiment.

FIG. 14 is an example flow letterhead setting edit screen according to an example embodiment.

FIG. 18 illustrates a flow record view component according to an example embodiment.

FIG. 19 illustrates user interfaces for editing Apex Actions according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
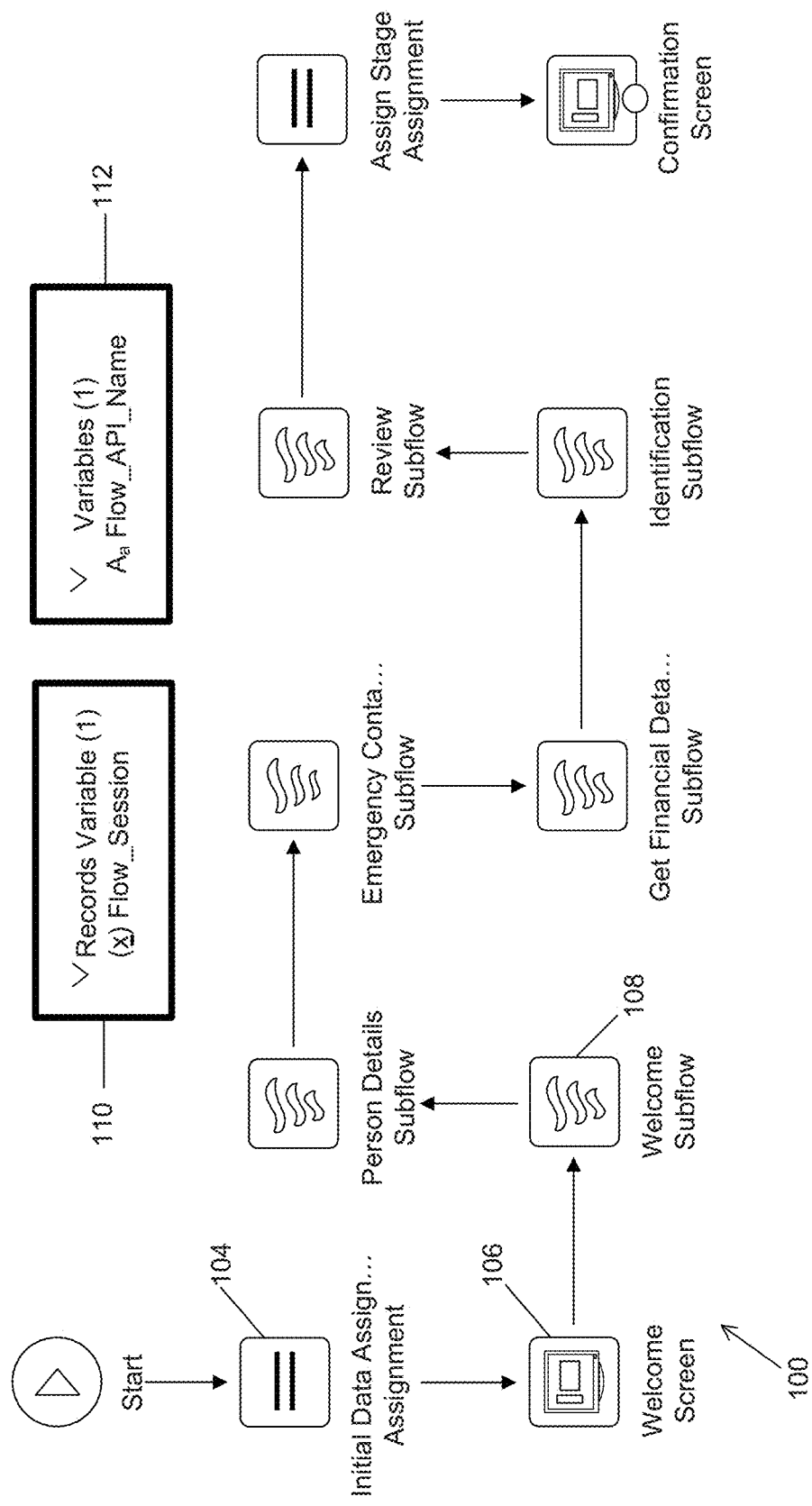
FIG. 1 is an example of master flow according to an example embodiment.

Provided herein are system, apparatus, device, method and/or computer program product embodiments, and/or combinations and sub-combinations thereof for capturing data of executed actions.

A flow is a sequential workflow made up of reusable components configured to execute business processes. The components may be pre-programmed objects configured to execute operations to provide various functionalities for users. For example, the components may request data, receive data, modify data records, create new data records, receive uploaded files, provide files for download, or the like. Flows may include components executing business logic based on rules defined in a runtime configuration. Flows may further include screens (or user interfaces) configured to receive and request input or provide information to a user based on data processed by the component. The components of the flow may trigger actions based on the processed data or received input. An entity may implement a flow to build business processes such as purchasing products, transmitting applications, logging into an account, paying bills, making modifications to reservations, or the like.

The flow may be divided into a master flow with sub-flows included in the master flow. The master flow may be a master process, and the sub-flow may be a sub-process. The master flow may be configured to execute a task. The sub-flow may be configured to execute a sub-task related to a task. The component in the master flow or sub-flow may be configured to execute operations related to the task. Different components in the master process may invoke the sub-flow. Alternatively, the sub-flows themselves may have further sub-flow, thereby, other sub-flows may invoke the sub-flow. The master flow's and sub-flows' runtime configuration may be defined by a metadata object (or metadata). Elements of the metadata object may be modified and propagated throughout the master and sub-flows.

The master and sub-flows may be included in pre-generated templates stored in a database. The master and sub-flows may be customized by modifying the elements of the metadata object. Flow builders may be used to build master and sub-flows. Pre-generated templates for the master and sub-flows may be populated into the flow builders.

In an embodiment, a central system activates a master process (e.g., master flow), including a sub-process (e.g., sub-flow) and a pre-programmed object (e.g., component). The master process is configured to execute a task using the sub-process and pre-programmed object. The central system initializes a variable corresponding to the master process. The central system further identifies a metadata object using the variable. The metadata object defines a runtime configuration of the master process and sub-process. The central system receives a modification to a setting of the metadata object and propagates the modification of the setting in the metadata object to the master process and sub-process.

The system describes herein provides for modifying the runtime configuration during runtime of the master flow. A flow's path may be dictated by configurable predicates, and sub-flows can be bypassed using custom metadata. Furthermore, the system provides for environment-specific variables that are externalized and unobtrusively maintained. A centralized source can be used to declare defaults that can be overridden, independent of other flow definitions. This way, the system allows for changes in the metadata to be propagated throughout the flows and sub-flows, seamlessly. In this regard, the system allows the flow to operate effectively, and avoids any costly delays and reduces the amount of use of operational resources.

FIG. 1 is an example of master flow 100 according to an example embodiment. The master flow 100 may include a start 102, components 104, screens 106, and sub-flows 108. The components 104, screens 106, and sub-flows 108 may be pre-programmed objects configured to execute operations to provide various functionalities to a user. As a non-limiting example, the master flow 100 may be an Employee Onboarding Flow used by Human Resource (HR) systems for collecting employee information for entities and businesses.

The components 104 may be assignment components and may include and initial data assignment component and assign stage component. The screens 106 may include a welcome screen a confirmation screen. The sub-flows 108 may include a welcome sub-flow, a person details sub-flow, an emergency contact sub-flow, get financial details sub-flow, identification sub-flow, and review sub-flow. The assignment components 104 may execute business logic, such as assigning values to variables or objects. The screens 106 may request and receive input as well as present information to a user. The sub-flows 108 may execute further components, screens, and sub-flows.

The master flow 100 may include two objects, flow_session 110 and flow_API_Name 112. Flow_session 110 is a record object of type Flow Session. It holds a reference to the Flow Session record, which was either created or retrieved in the Welcome & Get Started (Subflow_welcome_get_started) flow.

The Flow_Session.Id is passed into each subsequent flow element (sub-flow, screen, or component) so that each element (e.g., sub-flow or component) is aware of which record is being used. The Flow_Session.Id can be used to retrieve flow_session 110. Flow_session 110 is used as the default storage mechanism for the data captured throughout a users' flow session. Flow_session 110 allows the system to capture information without polluting any of the core objects with incomplete or unverified data. Once the data has been sanitized, the system can utilize the provided utility flow to convert the session data, e.g., running the Create Records From Flow Session (Auto-launched Flow) utility flow to create/update contact and associate the uploaded documents with that record after the information and documents have been validated, or approved by staff. A component can retrieve flow_session 110 using Flow_Session.Id. The component can execute its operations using the data stored in flow_session 110.

Flow_API_Name 112 is set in the 'Initial Data Assignment' element at the start of the flow. Its purpose is to segregate the Flow Sessions records and filter out the appropriate Flow Session Setting (Qsydapps_ao_flow_session_setting_mdt) custom metadata records. The flow_API_Name 112 variable may be associated with the master and sub-flows so that the appropriate metadata object defining the runtime configuration for the master and sub-flows is retrieved.

Figure 2:
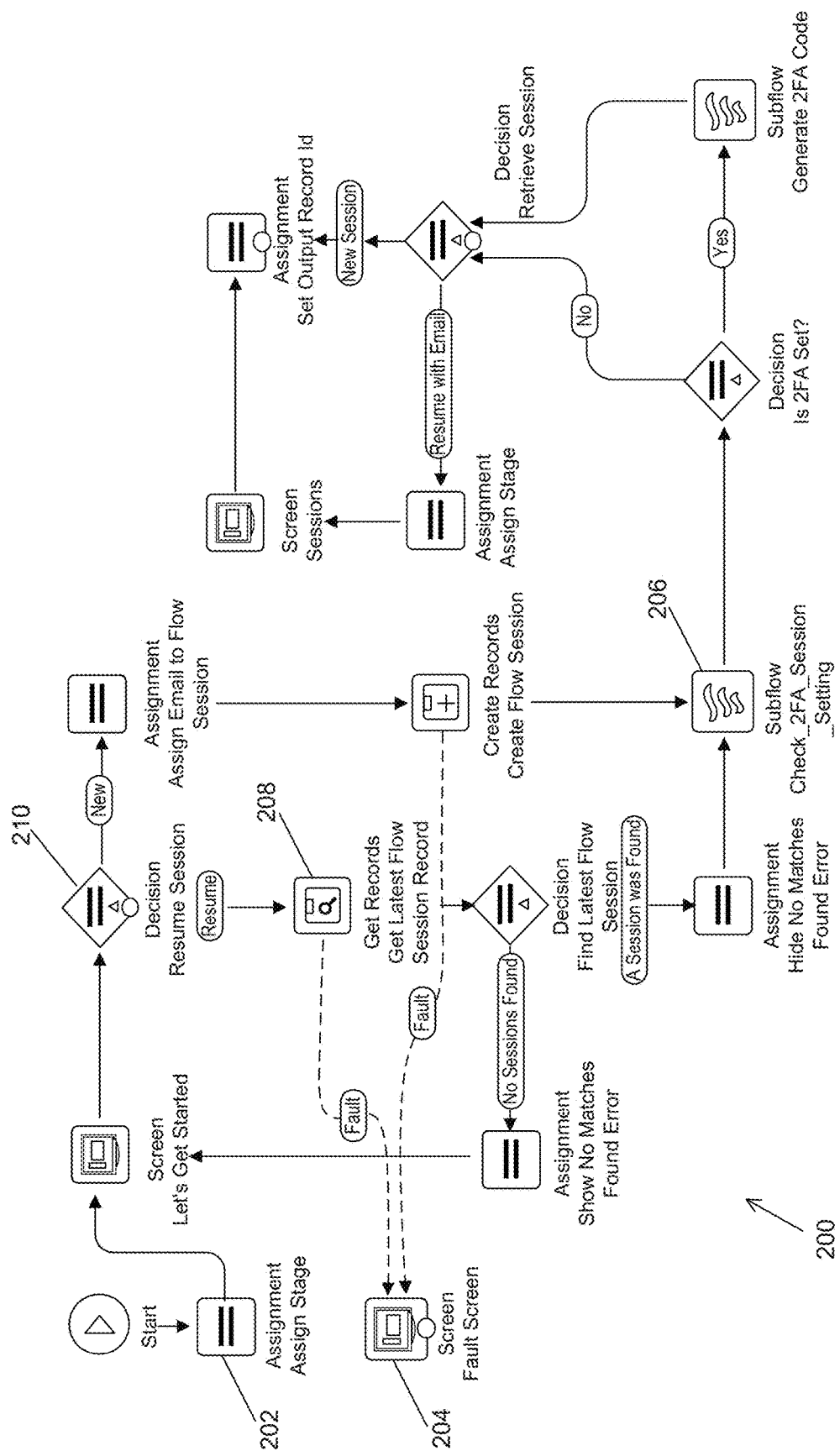
FIGS. 2-6 are example sub-flows according to an example embodiment.

FIG. 2 is an example sub-flow 200 according to an example embodiment. Sub-flow 200 may be the welcome & get started (Subflow_Welcome_Get_Started) sub-flow from the master flow, as shown in FIG. 1. The sub-flow 200 may receive the flow_API_Name variable and output record_id_O. The sub-flow 200 may include pre-programmed objects such as assignment components 202, screens 204, records components 208, and decision components 210. Sub-flow 200 may also include sub-flows 206. Decision components 210 may include business logic for executing decisions based on data posted to a decision component 210. The records components 208 may create, retrieve, modify, or delete data records.

The assignment components 202 may include assignment assign stage component, show no matches found error component, hide no matches found error component, and set output record id component. The screens 204 may include fault screen, let get started screen, and sessions screen. The decision components 210 may include resume session decision, find latest flow session decision, is two-factor authentication (FA) set decision, and retrieve session decision.

As a non-limiting example, the sub-flow 200 may capture the users' email address and either creates a Flow Session record or finds an existing Flow Session record. The sub-flow 200 may verify the user by emailing a One-Time-Passcode if this configuration is enabled in Flow Session Setting (Qsydapps_ao_flow_session_setting_mdt). The sub-flow may return the Flow Session record id (Record_Id_O) to the master flow, as shown in FIG. 1.

Figure 3:
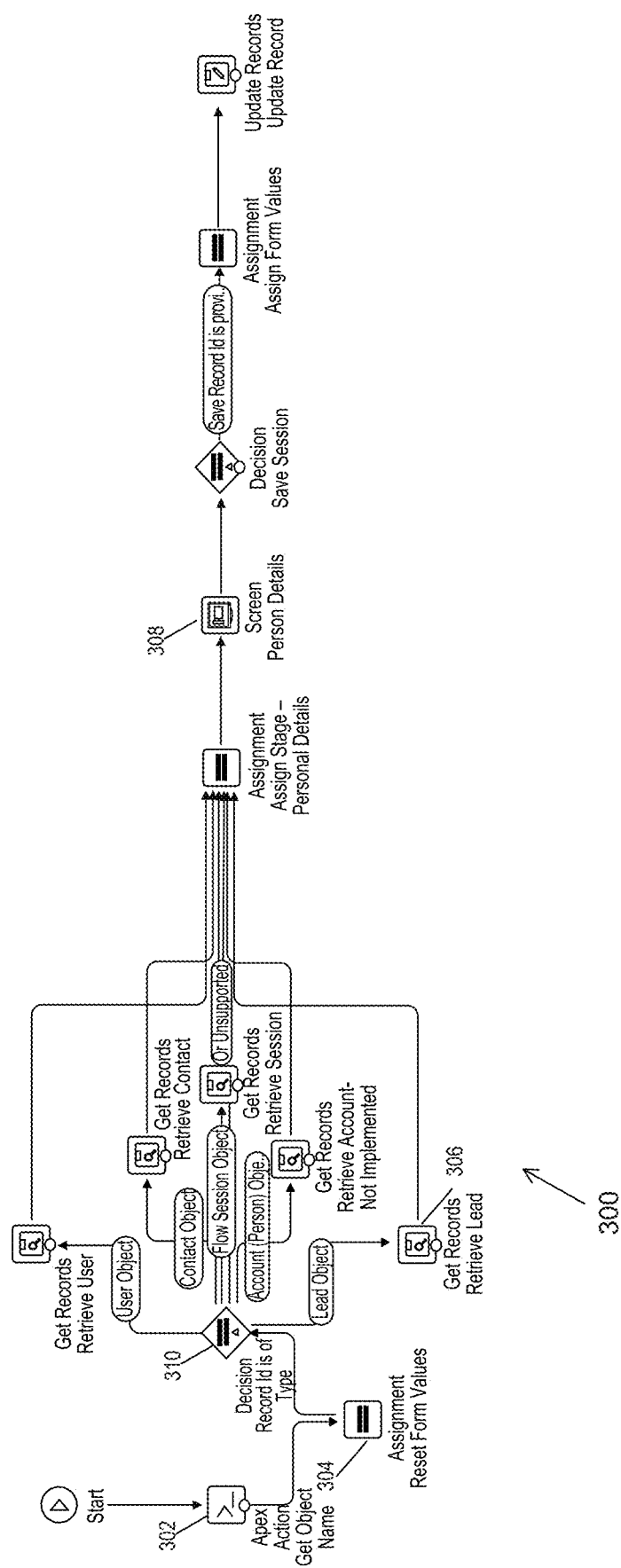

FIG. 3 is an example sub-flow 300 according to an example embodiment. Sub-flow 300 may be the get personal details (Subflow_Person_Details) included in the master flow, as shown in FIG. 1. The sub-flow 300 may include apex action components 302, assignment components 304, record components 306, screens 308, and decision components 310. The apex action components 302 may include getting an object name. The assignment component 304 may include reset form values, assign stage personal details, save session, assign form values. The records components 306 may include retrieve user, retrieve contact, retrieve session, retrieve account, and retrieve lead. The screens 308 may include person details. The decision component 310 may include record id is of which type.

As a non-limiting example, the sub-flow 300 may determine a type of object based on the prefix of the Record_Id_to_Retrieve_I. The objects may be user, contact, flow session, account, and lead. The sub-flow 300 may retrieve the record, populate the personal details of the field if the record exists, and save the updated values to the Flow Session (Record_Id_to_Save_I) record. The sub-flow 300 may return the list of output variables. The output variables may be split up instead of returning a single variable object to allow for different person type records to be retrieved.

Figure 4A:
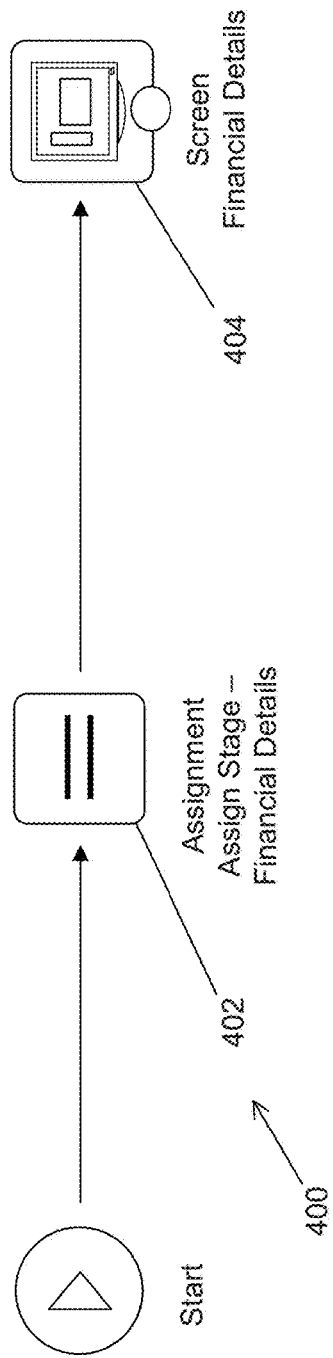
Figure 4B:
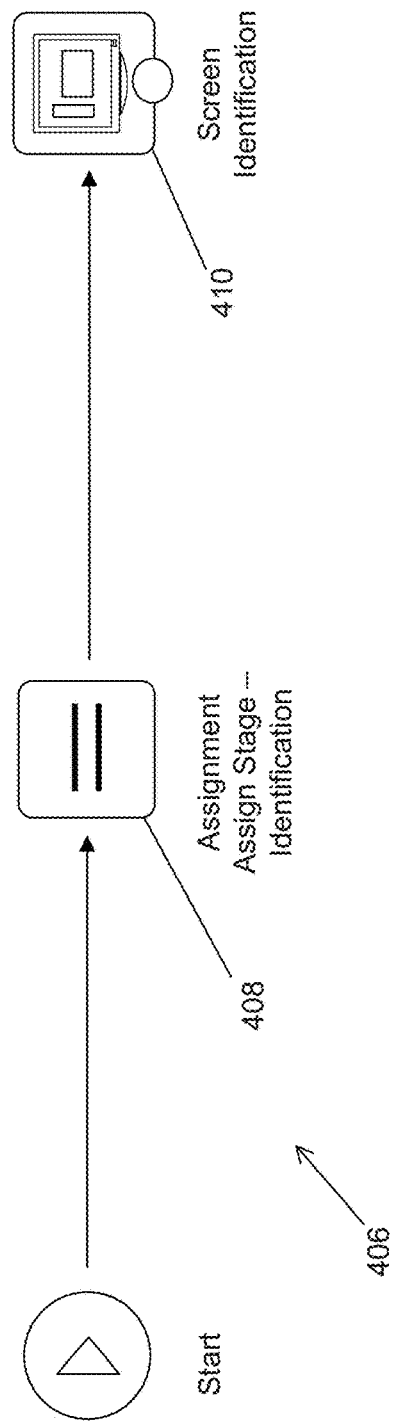

FIGS. 4A-4B are example sub-flows 400 and 406 according to an example embodiment. With reference to FIG. 4A, sub-flow 400 may get financial details (Subflow_Get_Financial_Details) sub-flow included in the master flow, as shown in FIG. 1. The sub-flow 400 may include an assignment component 402 and a screen 404. The assignment component 402 may be assigned stage-financial details, and screen 404 may be financial details. The sub-flow 400 may receive Flow_API_Name_I and Flow_Session_Id_I as inputs.

As a non-limiting example, the sub-flow 400 may displays a document upload (e.g., a Lightning flow document) component configured to show the "Finance" category as configured in the Flow Document(Qsydapps_ao_document_mdt). Uploaded files may be associated with the Flow_Session_Id_I.

With reference to FIG. 4B, sub-flow 406 may be a GET identification details (Subflow_Get_Identification_Details) sub-flow included in the master flow, as shown in FIG. 1. The sub-flow 406 may include an assignment component 408 and a screen 410. The assignment component 408 may be assign-stage identification, and screen 410 may be an interface for displaying identification. The sub-flow 406 may receive Flow_API_Name_I, Record_Id_to_Retrieve_I, and Record_Id_to_Save_I as inputs.

As a non-limiting example, the sub-flow 406 may displays a document upload (e.g., a Lightning flow document) component configured to show the "Identification" category as configured in the Flow Document(Qsydapps_ao_document_mdt). Uploaded files may be associated with the Flow_Session_Id_I.

Figure 5:
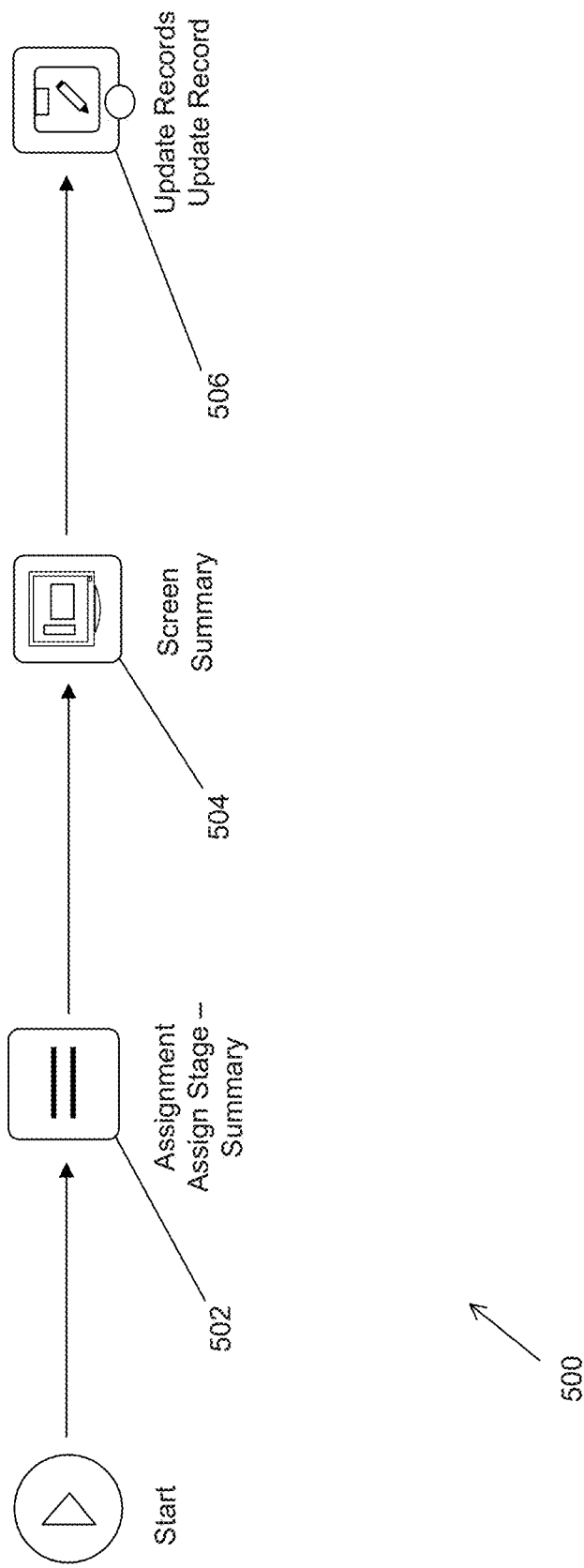

FIG. 5 is an example sub-flow 500 according to an example embodiment. Sub-flow 500 may be the Review (Subflow_Review) included in the master flow, as shown in FIG. 1. Sub-flow 500 may include an assignment component 502, a screen 504, and a records component 506. The assignment component 502 may be an assign stage-summary component. The screen 504 may be a summary screen. The records component 506 may be an update record component.

As a non-limiting example, the sub-flow 500 may use a record view (e.g., Lightning Flow record view) component to present a summarized view of the data for this flow so that users can review and confirm what they have entered. Progressing through this sub-flow updates the status to "submitted."

Figure 6:
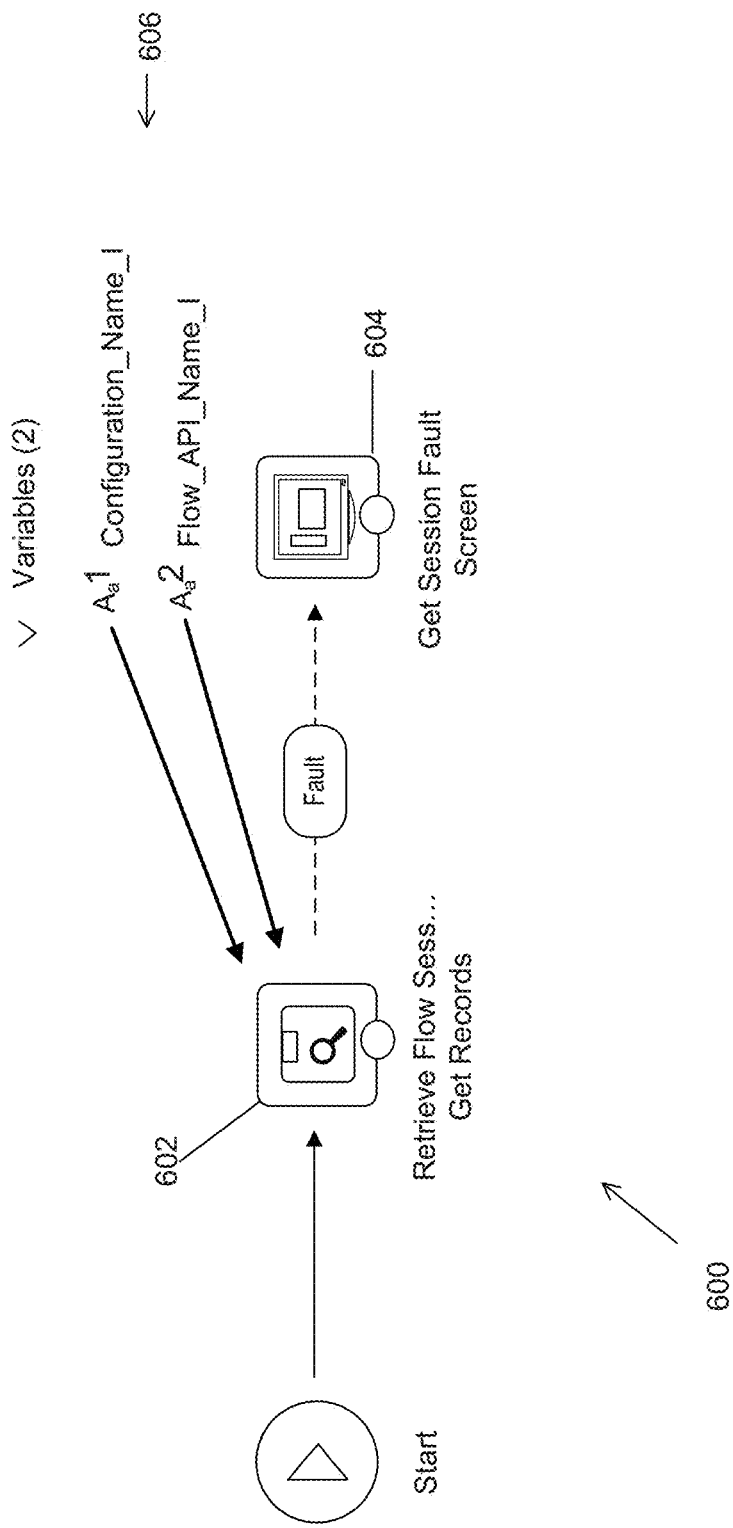

FIG. 6 is an example sub-flow 600 according to an example embodiment. Sub-flow 600 may be a utility flow. In particular, sub-flow may be a get session settings (Utility_Flow_Get_Session_Settings) sub-flow. The sub-flow 600 may include a records component 602, and a screen 604. The records component 602 may be a get records component for retrieving a flow session (e.g., flow_session 110, as shown in FIG. 1) using variables 606. Variables 606 may include Flow_API_Name (e.g., Flow_API_Name 112, as shown in FIG. 1). Screen 604 may be a get session fault screen.

As a non-limiting example, the sub-flow 600 may query the Flow Session Setting custom metadata object (e.g., metadata object) filtering on the Configuration Name and Flow API Name. The sub-flow 600 may return the value(s) to the master flow or return null if no record is found.

Figure 7:
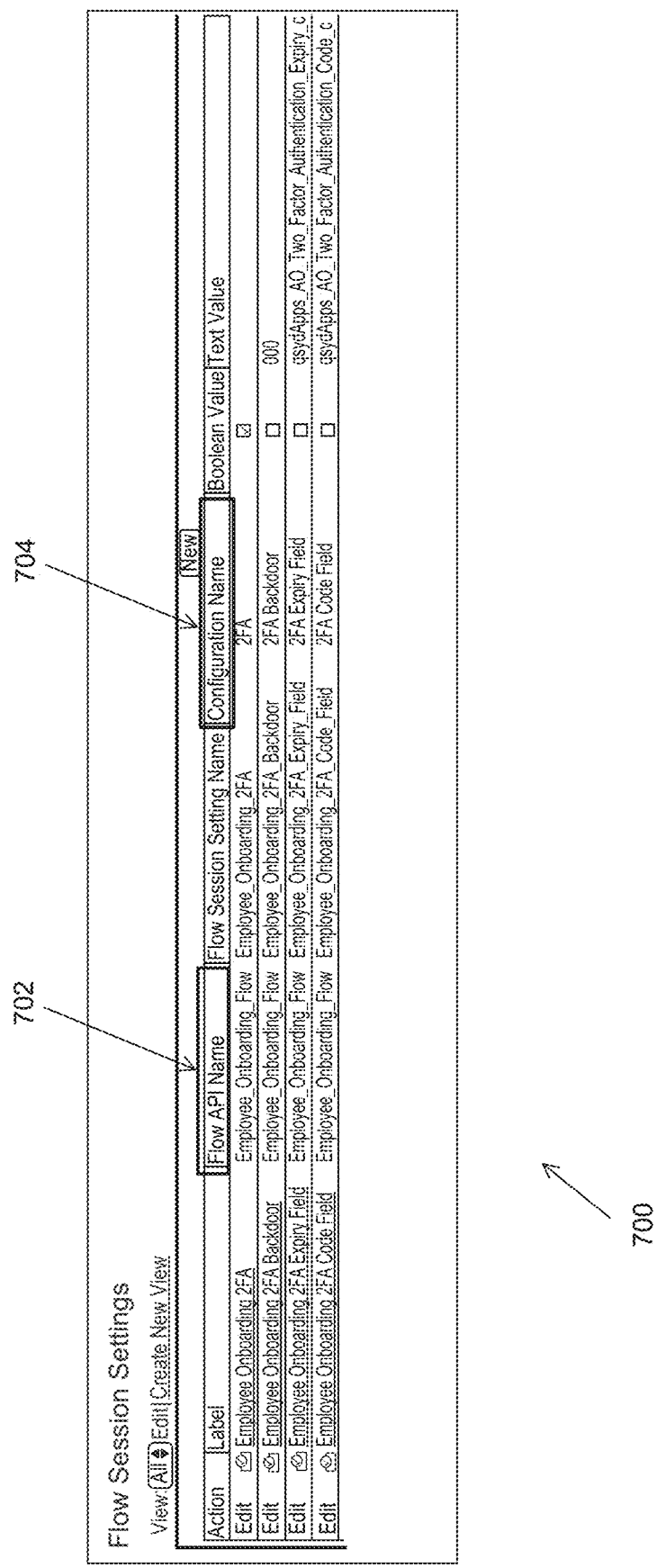
FIG. 7 illustrates flow session settings according to an example embodiment.

FIG. 7 is an example flow session settings 700 defined in a metadata object according to an example embodiment. The flow session settings 700 may include option 704 to enable two-factor authentication for the flows associated with the specified Flow_API_Name 702. The flow session settings 700 may also include other session settings for the respective flows.

As described above, the metadata object defines the runtime configuration of the master flow and each sub-flow. The runtime configuration can be defined by the flow session setting 700. The flow session setting can include various settings for executing operations. The components in the master flow and the sub-flow may execute operations based on the flow session settings 700.

For example, the flow session setting may include a setting to enable two-factor authentication. As such, the sub-flow in the master flow configured to authenticate a user may include a component for implementing two-factor authentication if the setting for two-factor authentication is enabled. Alternatively, the sub-flow in the master flow configured to authenticate the user, may remove or not include a component for implementing two-factor authentication if the setting for two-factor authentication is disabled.

Figure 8:
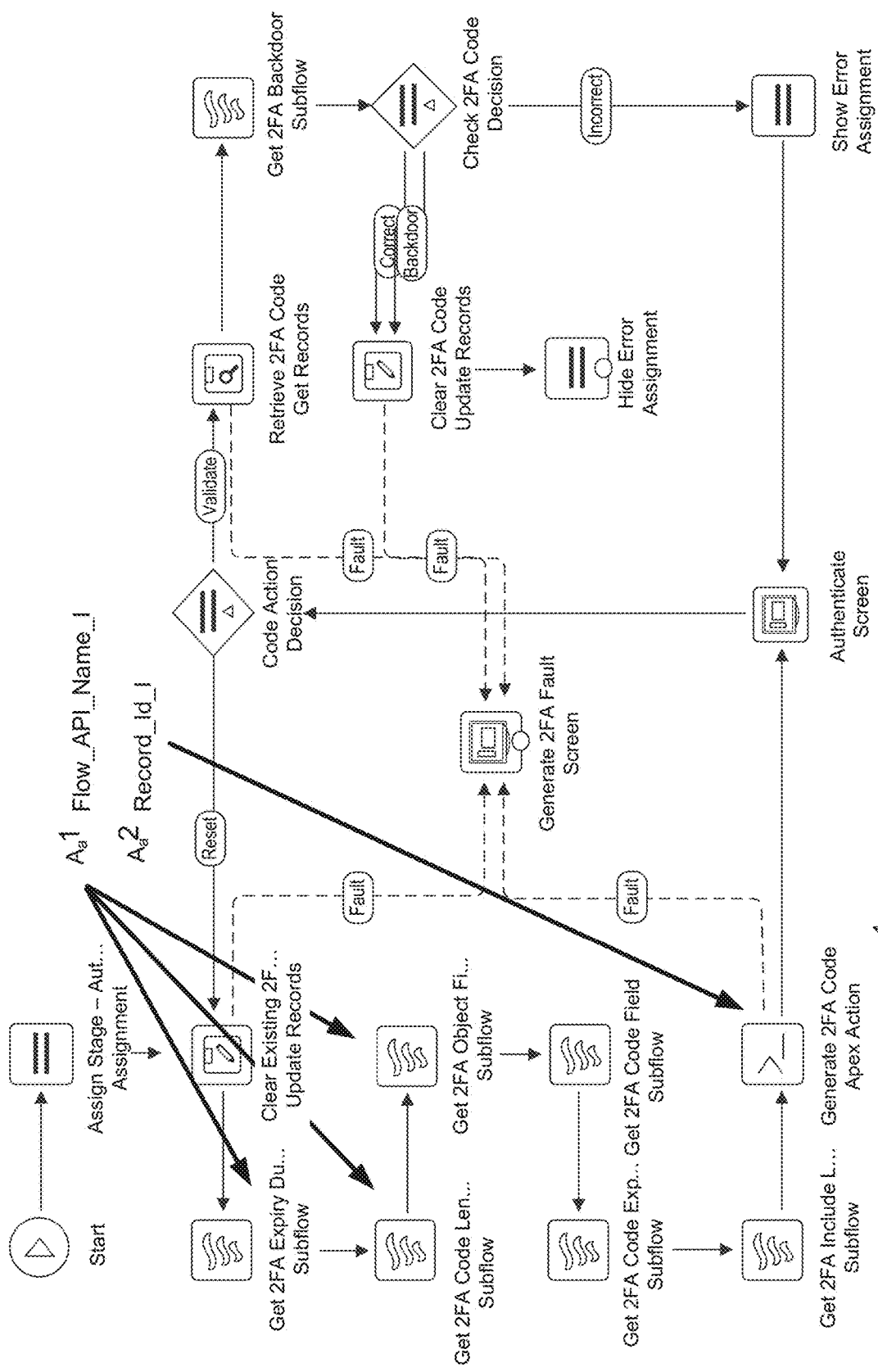
FIG. 8 is an example sub-flow configured to perform two-factor authentication according to an example embodiment.

FIG. 8 is an example sub-flow 800 according to an example embodiment. Sub-flow 800 may be a generate two-factor authentication code (Utility_Flow_Generate_Two_Factor_Authentication_Code) sub-flow included in the welcome & get started (Subflow_Welcome_Get_Started) sub-flow as shown in FIG. 2. The sub-flow 800 may include sub-flows, screens, assignment components, code action components, error components, and decision components. The sub-flow 800 may receive Flow_API_Name_I and Record_Id_I as inputs.

As a non-limiting example, sub-flow 800 may call the get session settings (Utility_Flow_Get_Session_Settings) sub-flow to retrieve the 2FA flow session setting Flow Session Setting (Qsydapps_ao_flow_session_setting_mdt) records. Sub-flow 800 may generate an onetime passcode (OTP) and save the OTP along with the expiration date against the Record_Id_I record. The sub-flow 800 may prompt the user to enter the OTP, which was sent to their email address. The sub-flow 800 may verify that the user has entered the correct code and continue or display an error if entered code does not match or has expired.

Figure 9:
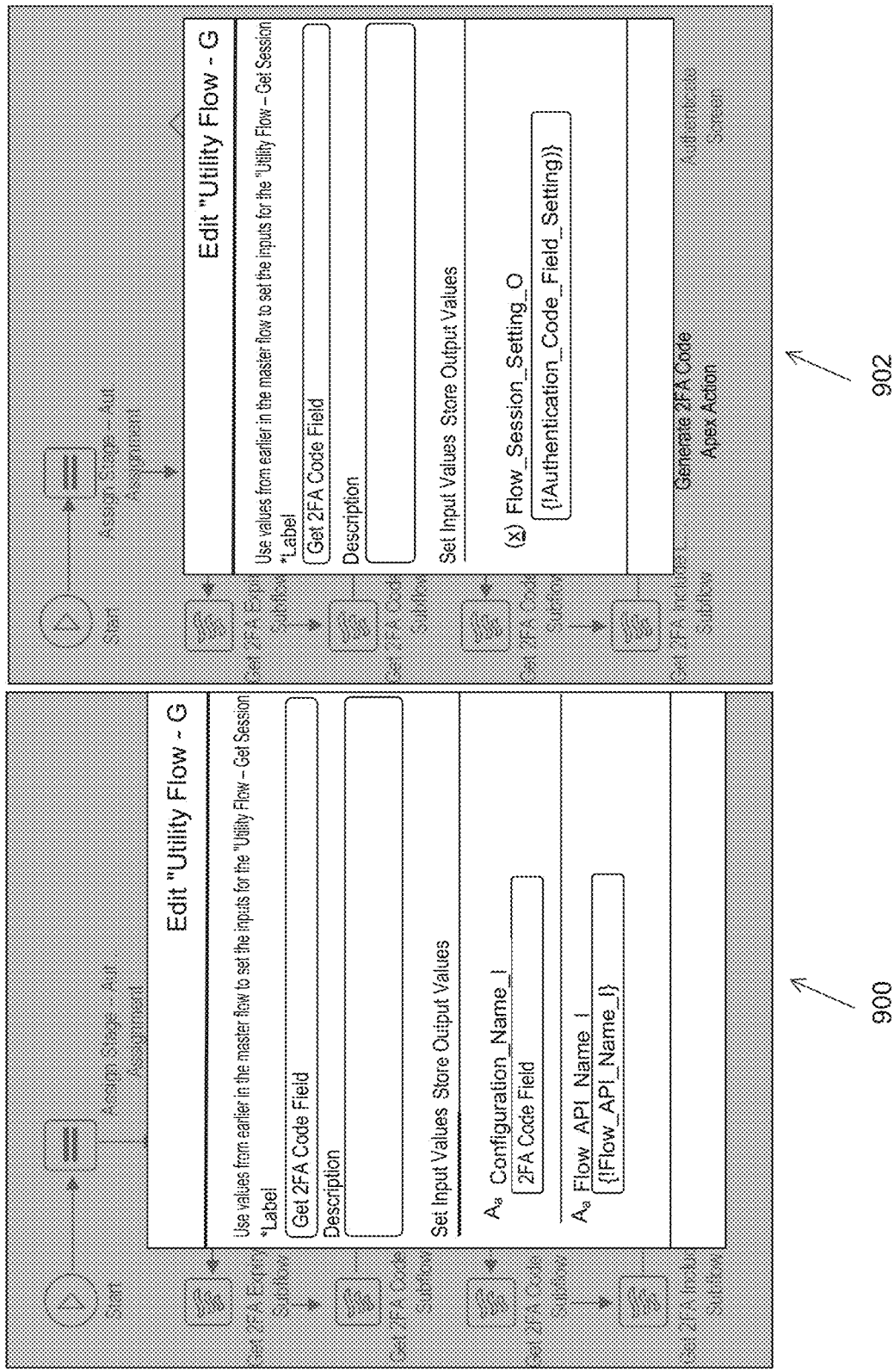
FIG. 9 illustrates example user interfaces for editing a utility sub-flow according to an example embodiment.

FIG. 9 illustrates example user interfaces for editing a utility sub-flow according to an example embodiment. User interfaces 900-902 illustrate modifying fields for the get 2FA Code Field sub-flow. User interface 900 indicates the input values for the configuration name and Flow_API_Name_1. User interface 902 indicates the store output value for the Flow_Session_Setting_O. As an example, the Get Session Settings (Utility_flow_get_session_settings) sub-flow may be used for retrieving the code field API name from the metadata object to be used as the storage field in a Flow Session setting record variable.

FIG. 10 illustrates a metadata object custom fields 1000 according to an example embodiment. The metadata object may define custom fields in the master and sub-flows. The custom fields may be a boolean value, configuration name, date-time value, date value, flow API Name, number value, or text value. Each of these custom fields may be tied to an API name and data type. The data type may define the type of input accepted for the custom field. For example, for the data type for the boolean value may be a check-box, the data type for the configuration name may be text, the data type for the date-time value may be date/time, the data type for date value may be a date, the data type for flow API name may be text, the data type for the number value may be numbers between 16 and 2 and the data type for the text value may be text.

Figure 11:
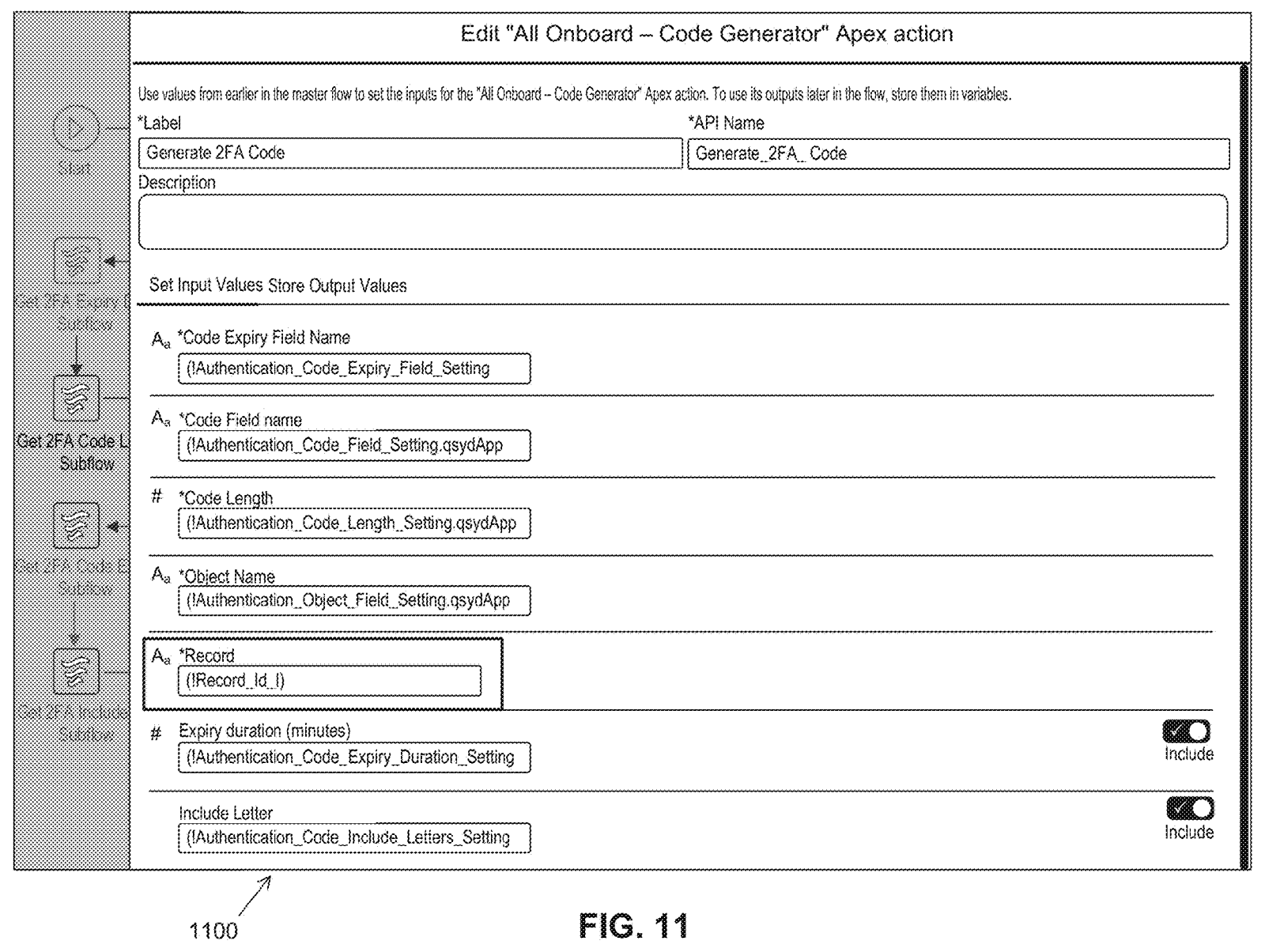

FIG. 11 is an example user interface 1100 for modifying a code generator for an apex action according to an example embodiment. User interface 1100 may indicate the label of the apex action (Generate 2FA code), the API name (Generate_2FA_Code), a set of input values, and a set of output values.

User interface 1100 may be used to create a component (e.g., apex action) to generate a code for two-factor authentication. For example, two-factor authentication often involves providing a code to a user, which the user provides back to the system for authentication purposes. The user interface 1100 can be used to define the settings of the code for two-factor authentication that is provided to a user when a user is being authenticated. For example, the settings can include a duration of time before the expiration of the code, field name, code length, and an option of whether to include letters as well as numbers or just numbers. In response to submitting the settings information on user interface 1100, a component can be generated (or modified) configured to generate a code for two-factor authentication.

Figure 12:
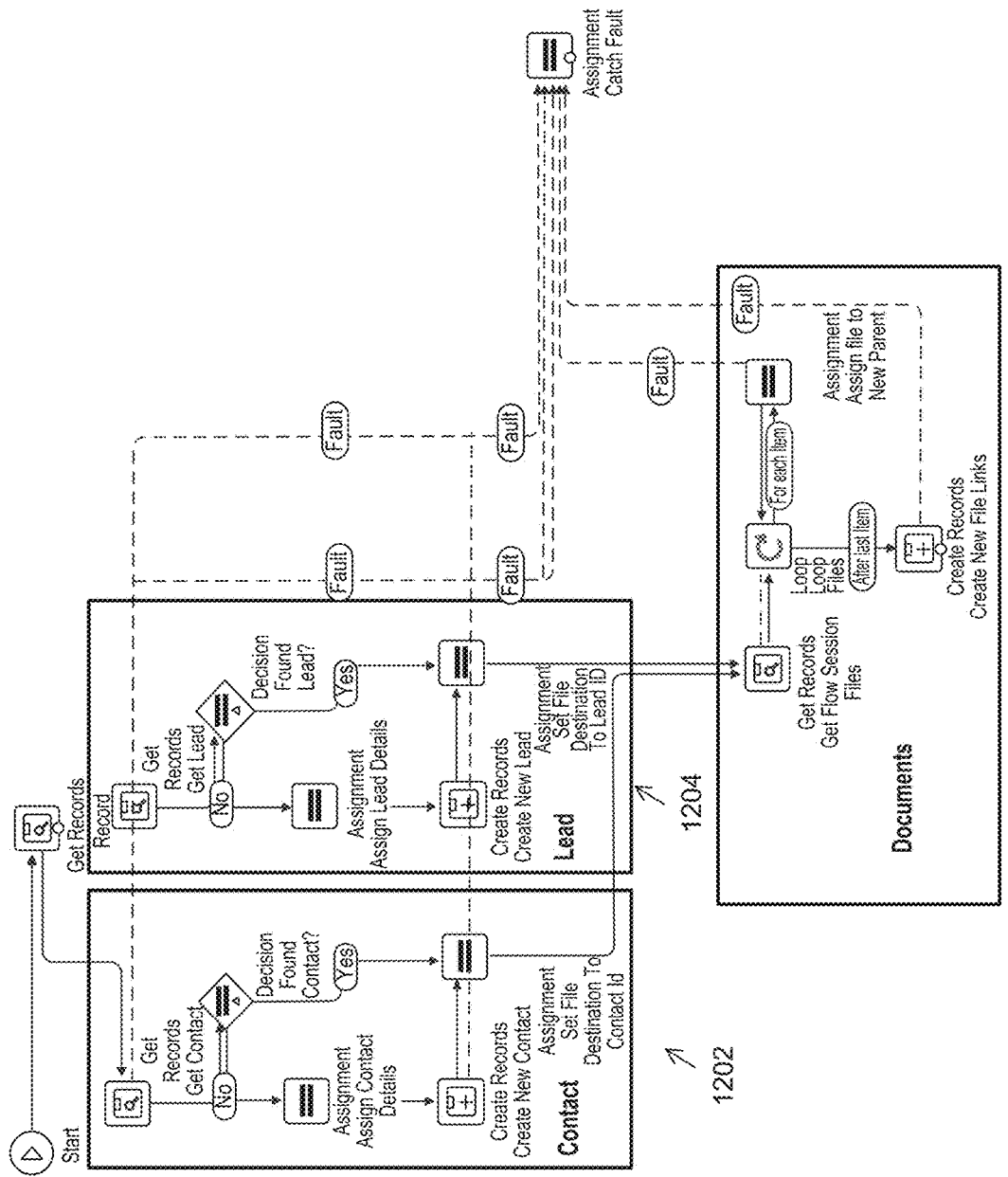
FIG. 12 is an example sub-flow according to an example embodiment.

FIG. 12 is an example sub-flow 1200 according to an example embodiment. The sub-flow 1200 may be a Create Records from Flow Session (Auto-launched flow) sub-flow. This flow is an example of a conversion flow. This sub-flow 1200 uses the data found in the Flow Session record, which was captured during an earlier flow execution. If a target record (contact 1202 or lead 1204 in this case) is found, the system may update that record with the latest data captured in the sub-flow 1200, or create a new record if none is found. Following the retrieval or creation of a contact record 1202, the elements in the 'Documents' area 1206 will get the attached files of the Flow Session record and attach them to the contact record 1202.

Figure 13:
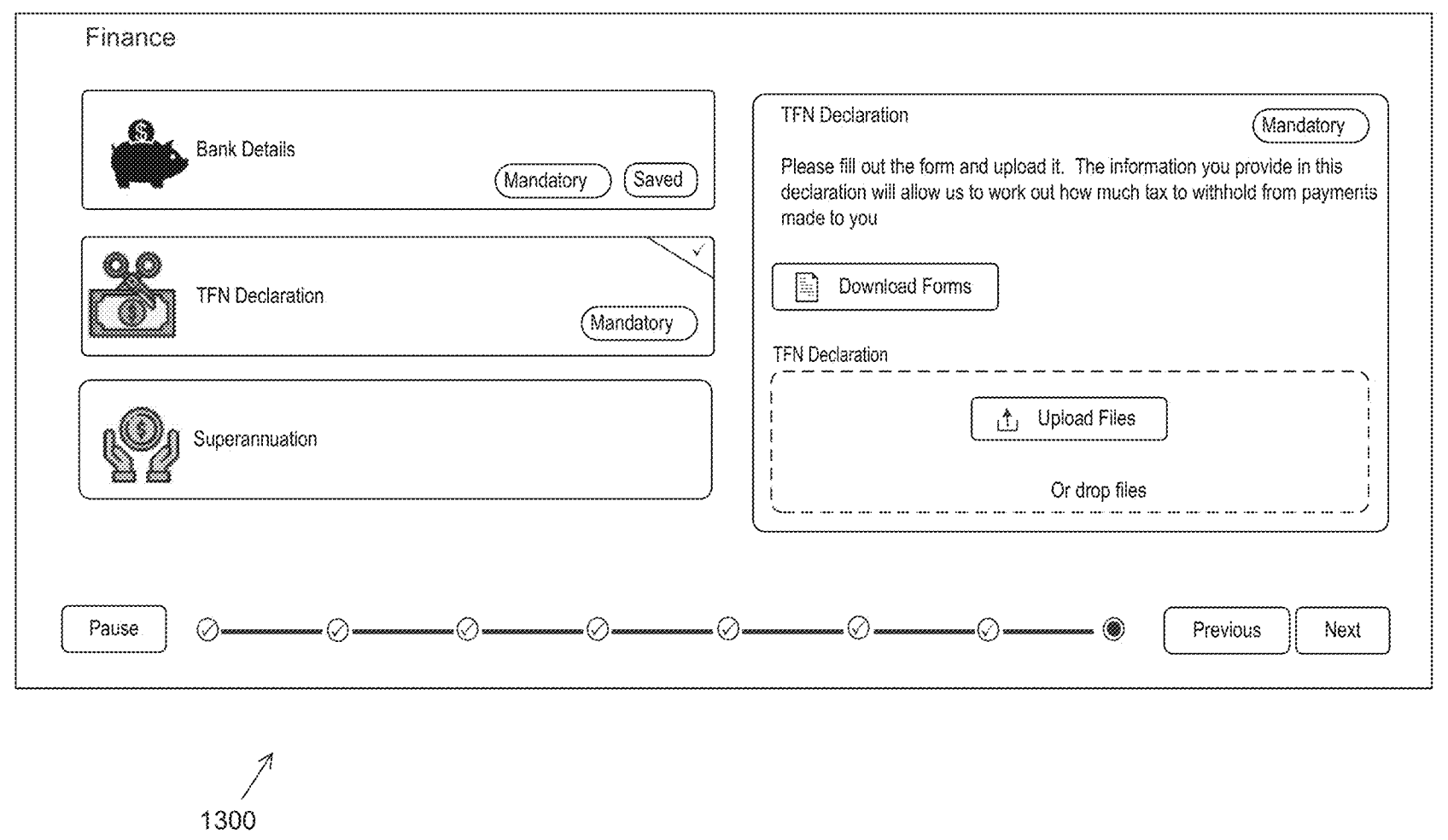

FIG. 13 is an example document upload component 1300 according to an example embodiment. The document upload component 1300 is configured to allow users to upload documents required for an application process. For example, the master flow may define a process for receiving documents from a user. The document upload component may be included in the master flow.

Different document types (e.g., Passport, Birth Certificate, Payslips, bank documents, or the like) can be configured in the custom metadata type Flow Document (Qsydapps_ao_document_mdt). An instance of the component filters document types by one category. Categories are used to group a set of documents to be displayed together. This can also be configured in the custom metadata type Flow Document Category (Qsydapps_ao_document_category_mdt).

Document types can be configured so that they may or may not be required. Each document type can be given a score. Users may be required to upload sufficient documents to meet the target score. The target score is passed as an input of the component (Target Score). If the process does not require a minimum score, this attribute can be left as blank. Administrators may use the custom flow footer component to enforce flow users to upload all mandatory documents and meet the minimum score to move to the next flow screen.

The document upload component 1300 may receive the following inputs: Record ID: Id of the parent record to upload documents to; Category: Name of the Flow Document Category record (e.g., Identification); Target Score (Input): The Minimum total score to complete the document check for the specified category; and Show Title: Show category name as a title at the top of the component. The default value is true. The document upload component outputs Total Score (Output): The sum of points of all the supporting documents that are currently uploaded.

The document upload component 1300 may also provide for deleting an uploaded document. When deleting a document, the user may be shown a prompt confirming they want to delete the document. The prompt text may be defined as follows:

Delete Prompt Negative Button Text: Negative button text for the delete document prompt. If using a custom label, the value is the API name of the label. The default is Cmp_PromptNegativeButtonText, and the value is 'No.'

Delete Prompt Positive Button Text: Positive button text for the delete document prompt. If using a custom label, the value is the API name of the label. The default is Cmp_PromptPositiveButtonText, and the value is 'Yes.'

Delete Prompt Message: Detailed message for the delete document prompt. If using a custom label, the value is the API name of the label. The default is Cmp_PromptMessage, and the value is 'Are you sure you want to delete this document?'.

Delete Prompt Title: Title of the delete document prompt header. If using a custom label, the value is the API name of the label. The default is Cmp_PromptTitle, and the value is 'Delete document.'

As an example, a flow document component may store details of required/optional documents for an application. The flow document component may store details such as field label, field type, and description. The Flow Document category (qsydApps_AO_Document_Category_mdt) component may be a category defined for a group of document types that are required to complete a verification process.

In an embodiment, a flow script may allow a user to allow flow customization via CSS uploaded as a static resource. Flows can have independent styling by way of the Flow_API_Name_c. The CSS file may be modified as follows: specify the CSS static resource path in the Text Value c field of the Flow Document Category (Qsydapps_ao_document_category_mdt). The Configuration_Name_c should be 'Lightning Flow Styles.' The CSS may further be modified by passing in the CSS static resource path in the pathToStyle input parameter. This value will override the metadata value above. The CSS encapsulation is enforced by the use of the styleScopeClass. An adjacent DIV is created with the said class name allowing you to target your selectors.

FIG. 14 is an example flow letterhead setting edit screen 1400 according to an example embodiment. In an embodiment, the letterhead of the flow may be customized and configured. The letterhead component attributes shown in the screen 1400 may be configured. Furthermore, the custom metadata Flow Letterhead Setting (Qsydapps_ao_flow_letterhead_setting_mdt) may be modified. The Flow Letterhead Setting (qsydApps_AO_Flow_Letterhead_Setting_mdt) component may store the styles and image for the flow letterhead. The letterhead will be rendered for the user while the user is completing the task defined by the master flow. For example, if the master flow is directed to a process of a user uploading documents. The letterhead will be rendered for the user while the user is completing the steps of uploading documents.

Figure 15:
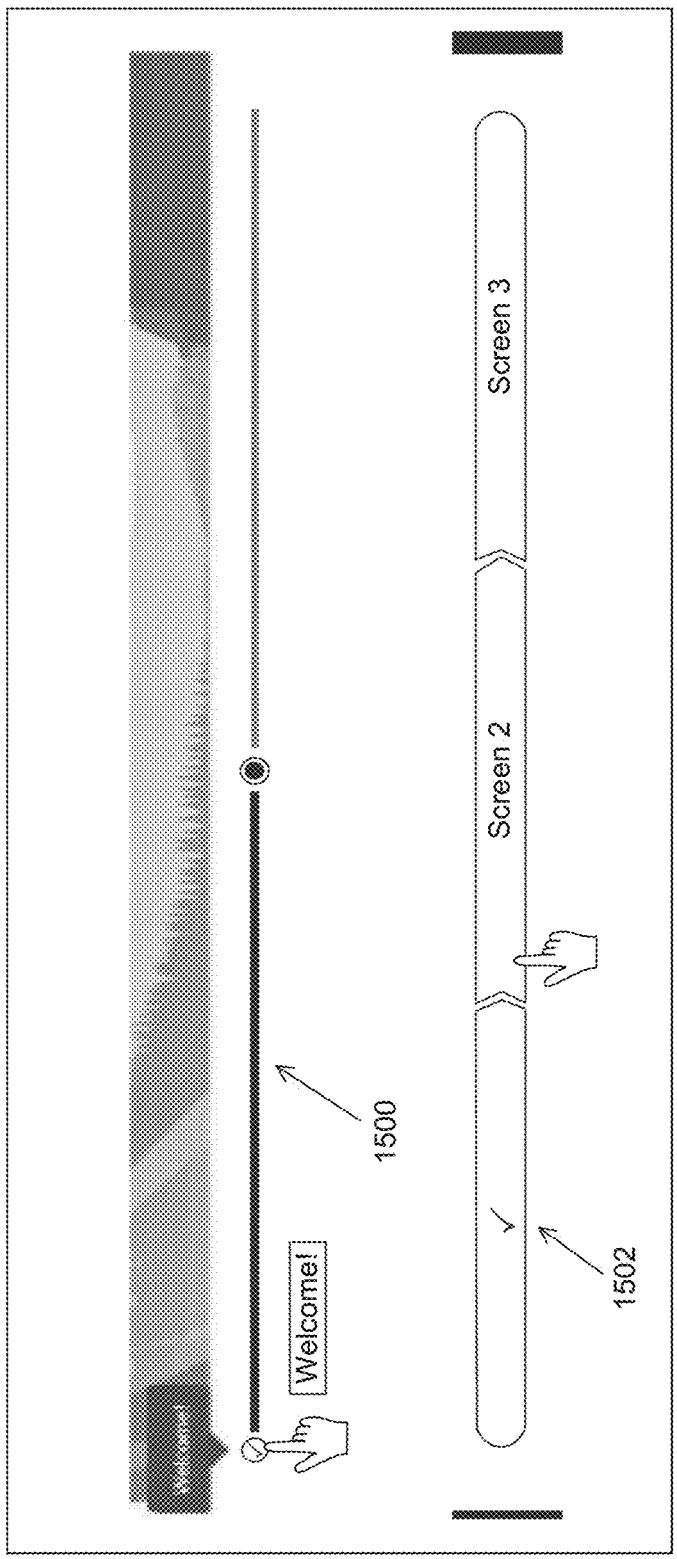
FIG. 15 is an example of a flow progress indicator component according to an example embodiment.

FIG. 15 is an example of a flow progress indicator component according to an example embodiment. The flow progress indicator component includes a base flow progress indicator component 1500 and path flow progress indicator 1502. The base flow progress indicator component 1500 and path flow progress indicator 1502 display a progress indicator with flow stages. The stages may be active stages, current stage, and progress indicator type. The $Flow.ActiveStages is a global variable that identifies all the active stages in the current flow. The $Flow.CurrentStage global variable that identifies the current stage. The $Flow.CurrentStage global variable makes sure the correct active stage is assigned to $Flow.CurrentStage variable. The progress indicator type changes the visual appearance of the indicator (base or path). The default value of the progress indicator type is base. The progress indicator may indicate the progress of a user of completing a task provided by the master flow.

Figure 16:
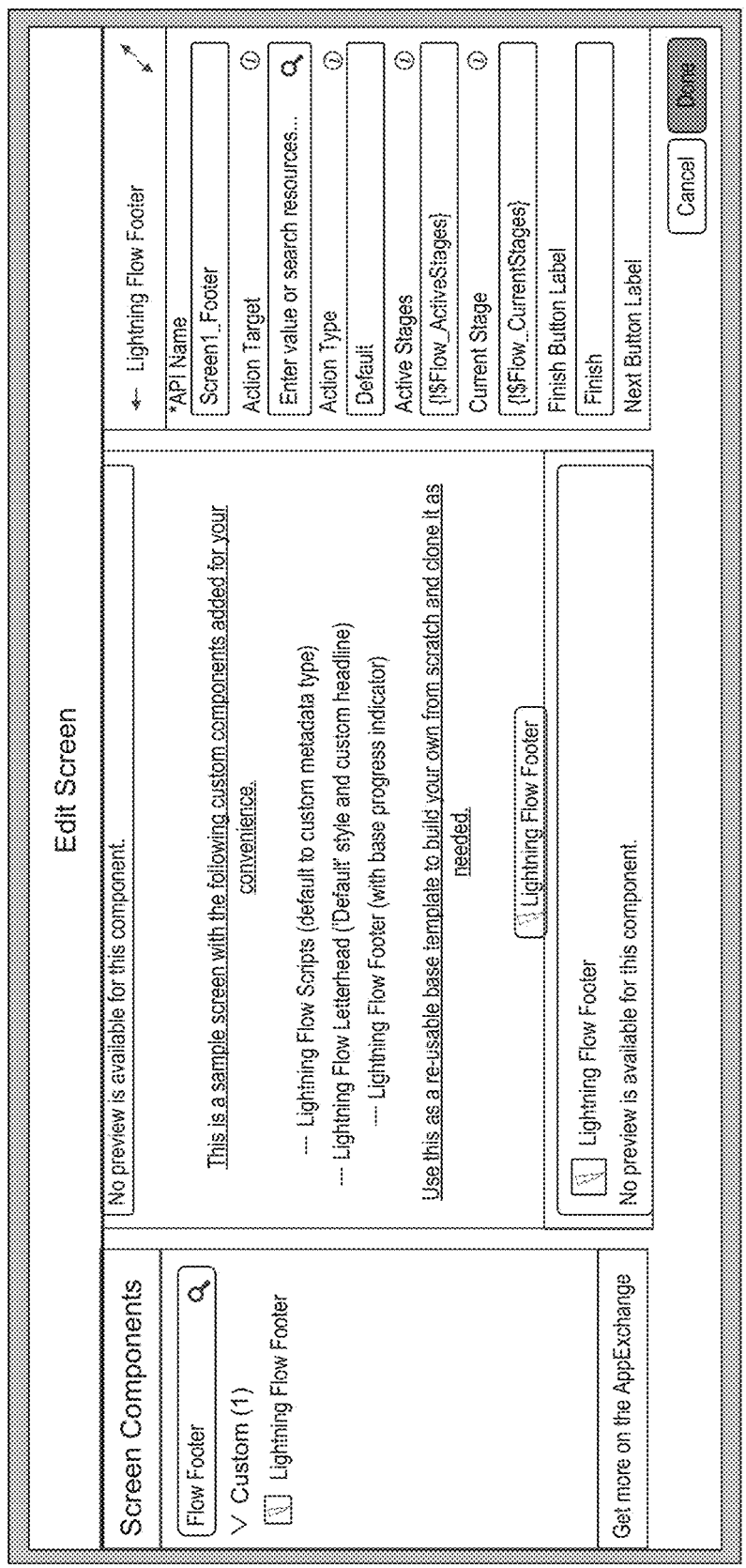
FIG. 16 is an example flow footer component according to an example embodiment.

FIG. 16 is an example flow footer component according to an example embodiment. The flow footer component may be an implementation of a custom Aura flow footer but may include an embedded flow progress indicator, as shown in FIG. 15. The lighting flow footer may include an edit screen 1600 for building and customizing the flow footer. The edit screen 1600 may include screen components, a screen for customizing the flow footer, and the flow footer details. The flow footer may indicate the progress of a user of completing a task provided by the master flow.

Figure 17:
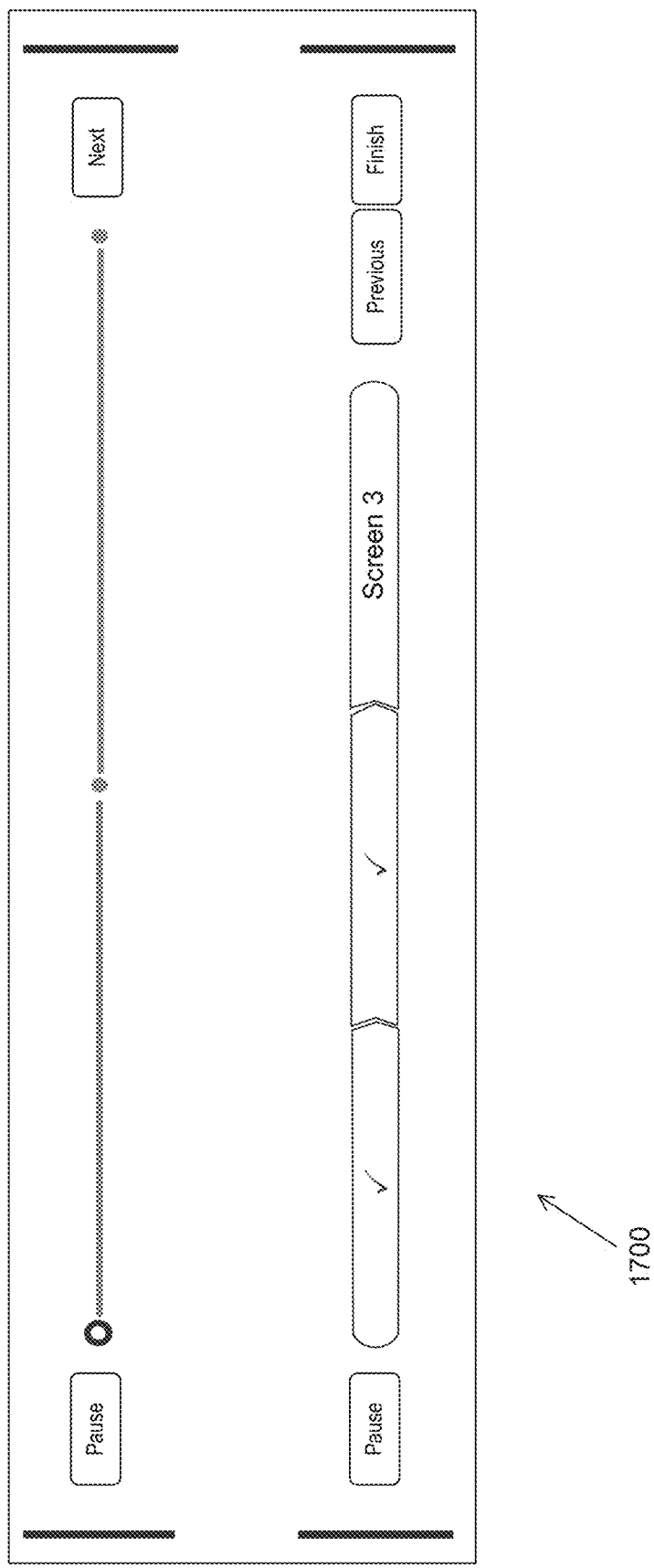
FIG. 17 illustrates example footers according to an example embodiment.

FIG. 17 illustrates example footers according to an example embodiment. The footer may include a base indicator type 1700 and a path indicator type 1702. Base indicator type 1700 or path indicator type 1702 may indicate the progress of a user of completing a task provided by the master flow. For example, if the master flow provides for a process for uploading documents, Base indicator type 1700 or path indicator type 1702 may indicate which steps the user has completed and which steps remain.

Figure 18:
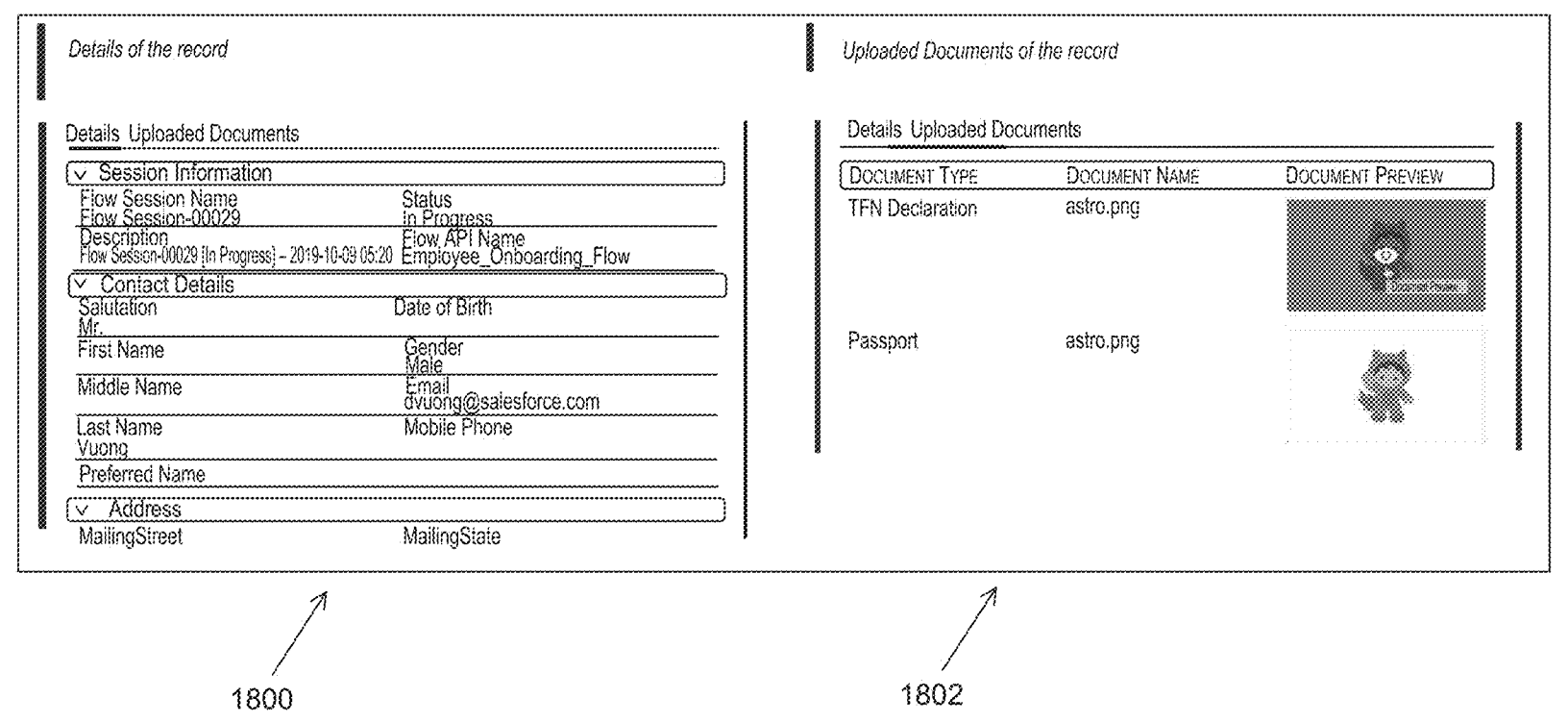

FIG. 18 illustrates a flow record view component according to an example embodiment. The flow record view component may use the record id as input to show both the record details 1800 and also a list of uploaded documents 1802 related to it. This information is displayed under separate tabs in order to keep a clean layout. The record details displayed follow the page layout settings that have been set up for your object (page layout and record types), and user permissions (object and field).

In an embodiment, a confetti component may be used to provide visual effects on the user interface. The effects may include cannon, fireworks, confetti shower, winner celebration, burst mode, or the like. The duration of the visual effects and the triggering of the visual effects may be customizable. The duration default may be three seconds. A public 'celebrate' method is available to call a list of effects on demand.

As an example, the confetti component may be included in a master flow to be triggered after the user has completed the process defined by the master flow. If the process was for the user to upload particular documents, the confetti component may be triggered in response to the user uploading the required documents.

Figure 19:
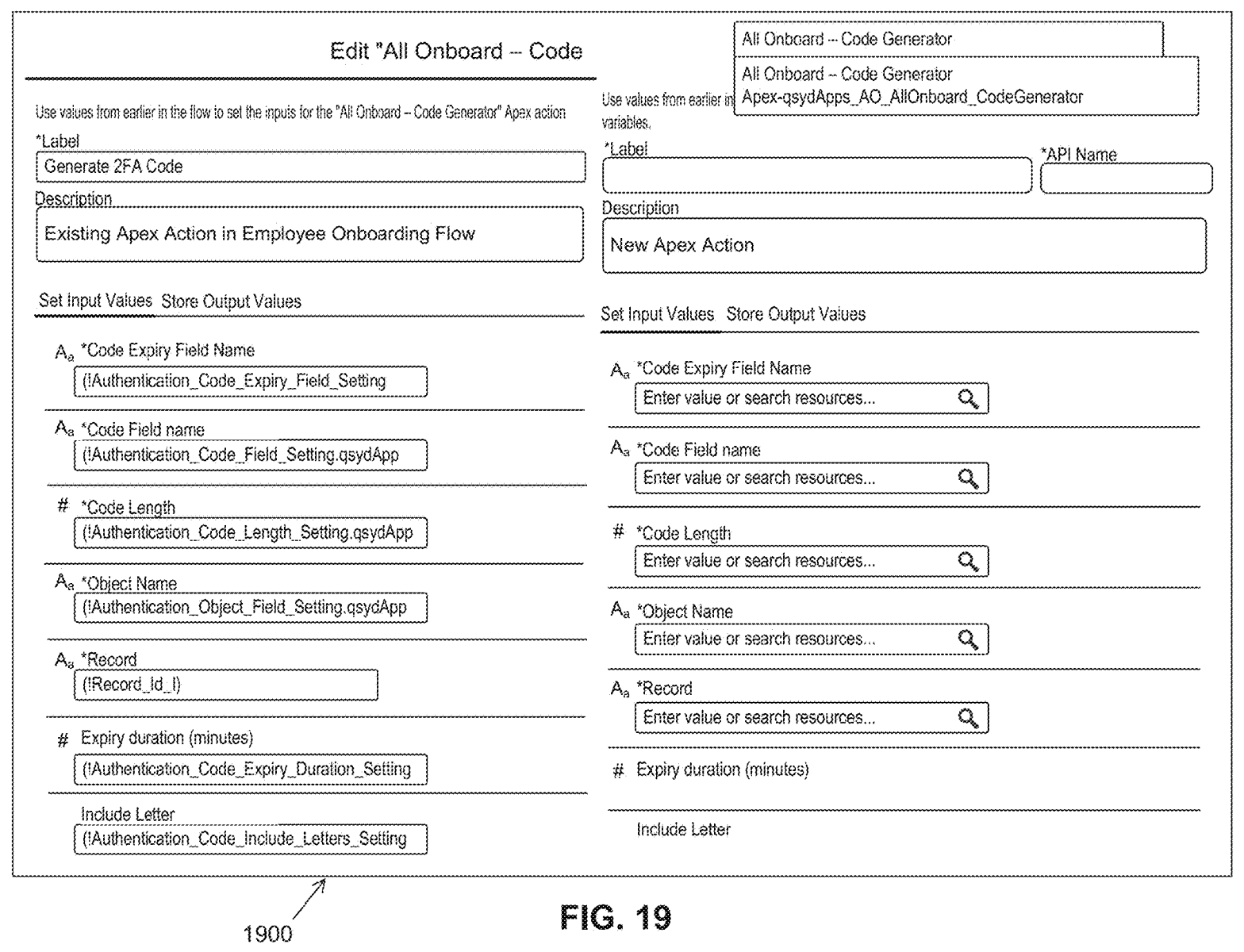

FIG. 19 illustrates user interface 1900 for editing components such as apex actions according to an example embodiment. The user interface 1900 may be for a code generator invocable apex action, which can be refactored into different use cases in either Flows or Process Builder. For an example of this being used, it's used in the Employee Onboarding Flow to function as Two Factor Authentication (2FA). A user can drag in a new action and look for "All Onboard—Code Generator," if the user desires to add their action. User interface 1900 may indicate the existing Apex Action in Employee Onboarding Flow. User interface 1902 may indicate the new Apex Action.

The code generator may take in a list of values to determine where the code is stored including Object Name—the object API name where the fields exist, Code Field Name—the text field API name on the object specified, where the code value is being saved, and Code Expiry Field Name—the date/time field API name on the object specified, to store the expiry date and time.

The code generator may take in a list of values to determine which record to store the code in, including Record Id—the record id matching the object type specified in the Object Name field.

The code generator may take in a list of values to determine what is the code composed of including Code Length and Include Letters. The Code Length may be a number value to specify how many characters the code will be. The minimum is a length of one (1). If an invalid value is provided, the length will default to six (6). The Include Letters may be a boolean field to determine whether the code will be alphanumeric or digits only. The default value does not include letters.

The code generator may take in a list of values to determine how long the code is used for of including Expiry Duration (minutes)—a number value to specify how many minutes the code is available for use. The minimum is one (1) minute. If an invalid value is provided, the duration will default to thirty (30).

Figure 20:
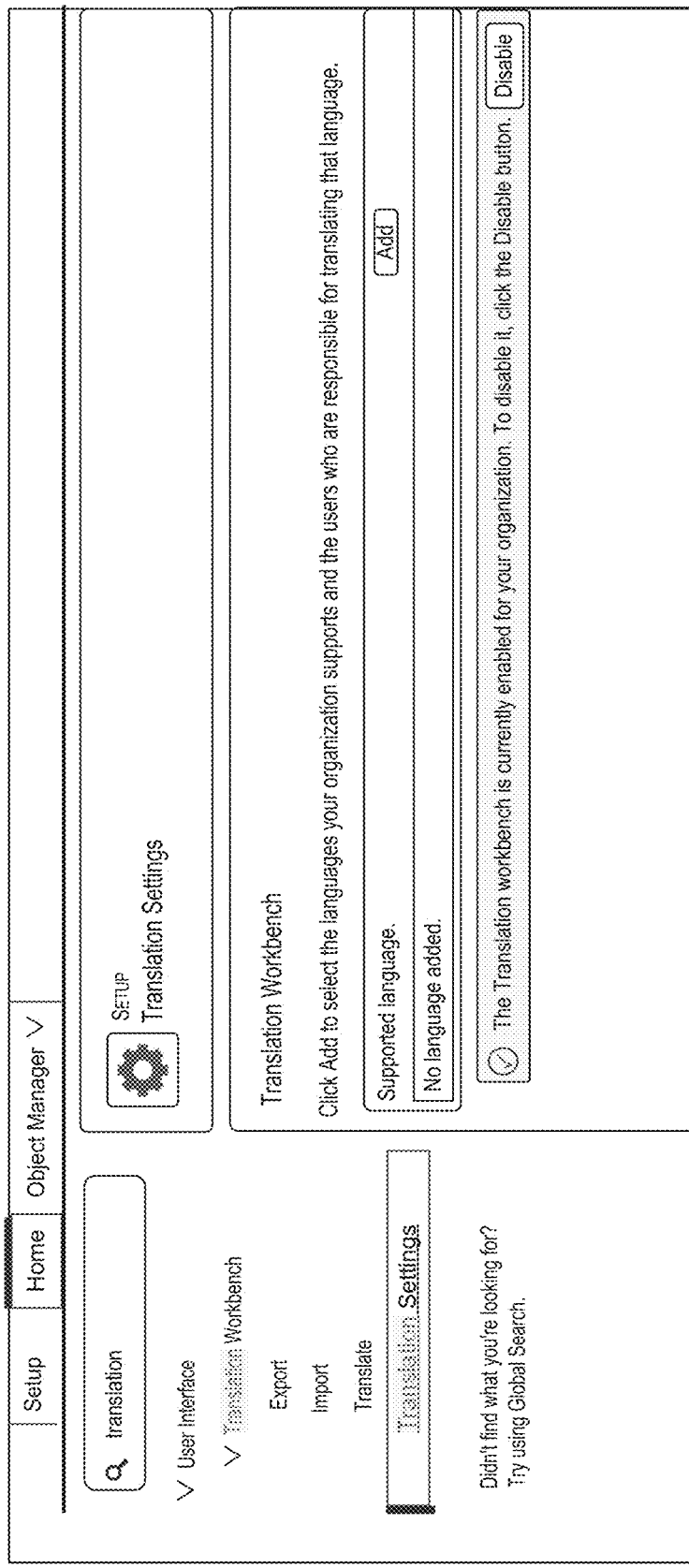
FIG. 20 illustrates a custom labels component according to an example embodiment.

FIG. 20 illustrates a custom labels component 2000 according to an example embodiment. Custom labels may provide translations to the provided flows. To add translations, follow the steps to enable Translation Workbench and add translations or overrides for the label.

Figure 21:
FIG. 21 illustrates a user interface to find custom labels according to an example embodiment

FIG. 21 illustrates a user interface 2100 to find custom labels according to an example embodiment. The custom labels may be filtered by field, operator, or value. User interface 2100 may also allow for Boolean operators such as "AND" or "OR."

Figure 22:
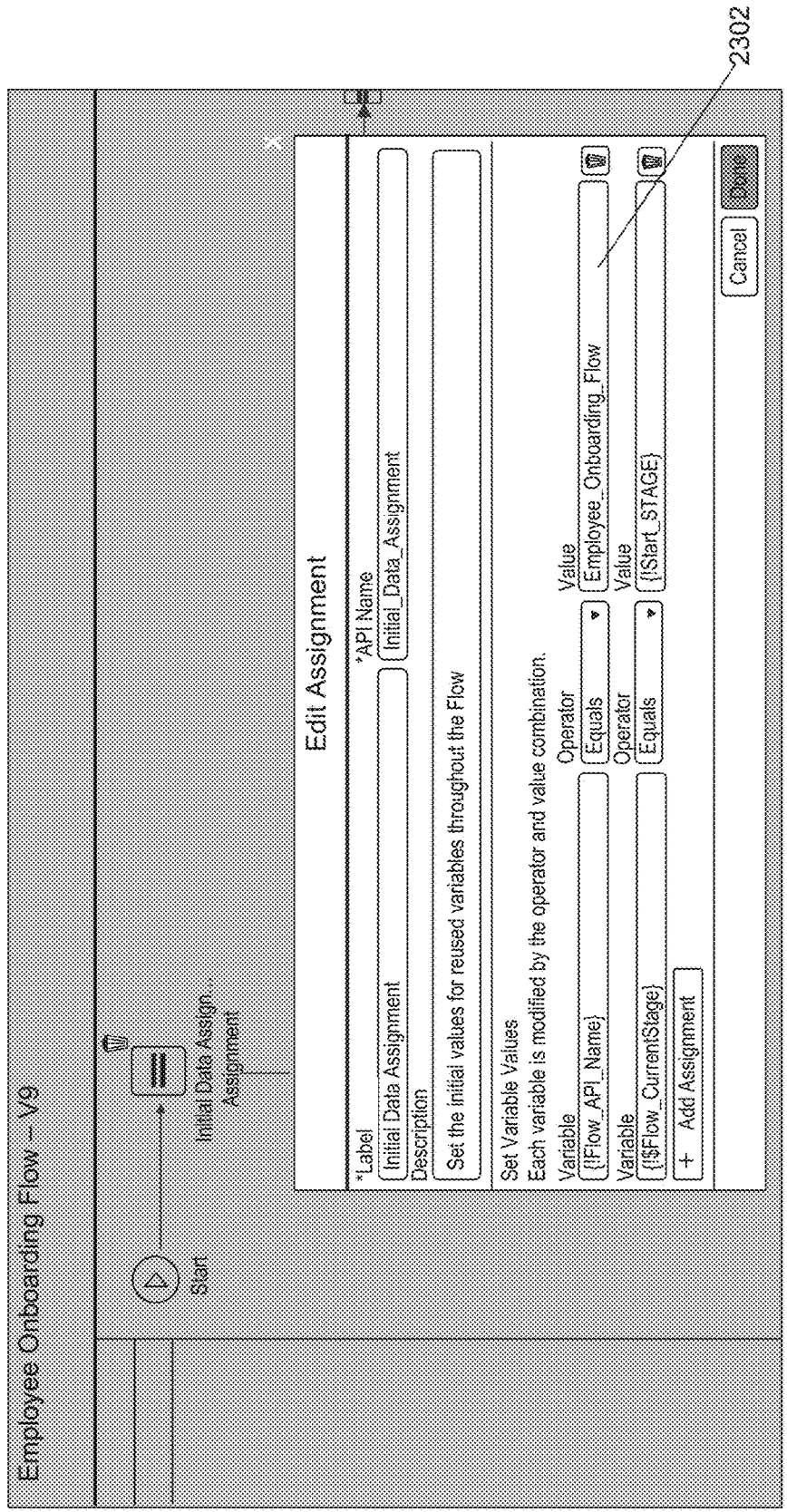
FIG. 22 is a block diagram of an interface configured to assign the Flow API Name for a master flow according to an example embodiment.

FIG. 22 is a block diagram of an interface 2200 configured to assign the Flow_API_Name for a master flow according to an example embodiment. Interface 2200 can be used to specify the Flow_API_Name for a new flow retrieved from a template. This ensures that the new flow is correlated to the metadata object so that that the correct context is used throughout the flow/sub-flows.

Figure 23:
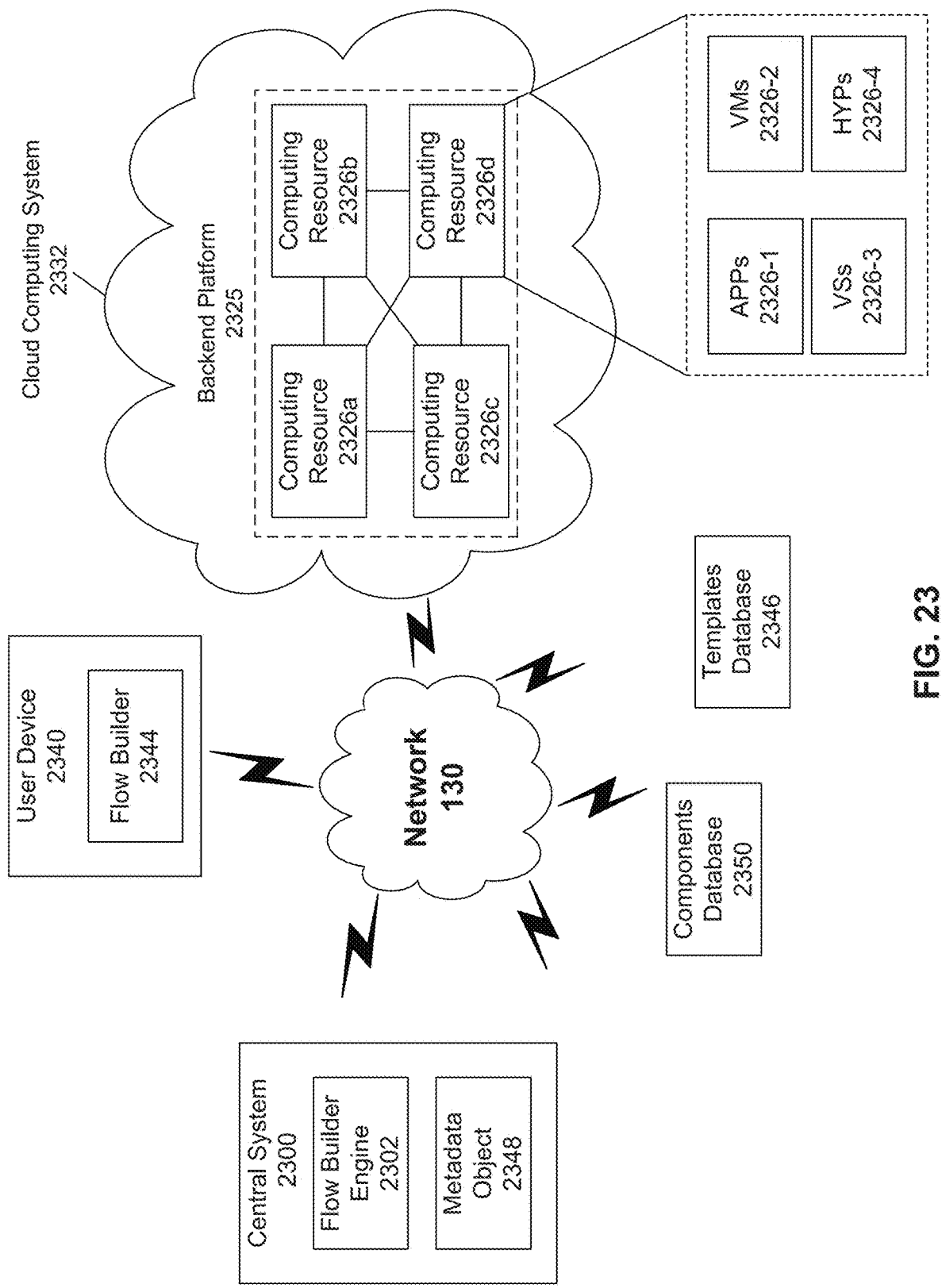
FIG. 23 is a block diagram of an example environment in which systems and/or methods described herein may be implemented according to an example embodiment.

FIG. 23 is a block diagram of an example environment in which systems and/or methods described herein may be implemented. The environment may include a central system 2300, a user device 2340, a templates database 2346, a backend platform 2325, a cloud computing system 2332, and a network 2330. The devices of the environment may be connected through wired connections, wireless connections, or a combination of wired and wireless connections.

In an example embodiment, one or more portions of the network 2330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Backend platform 2325 may include one or more devices configured to host flow builder 2344. Backend platform 2325 may include a server or a group of servers. In an embodiment, backend platform 2325 may be hosted in a cloud computing system 2332. It may be appreciated that backend platform 2325 may not be cloud-based, or may be partially cloud-based.

Central system 2300 and templates database 2346 may include one or more devices configured to interface with backend platform 2325. In an embodiment, the user device may execute a flow builder 2344. Flow builder 2344 may be an application used to build flows. Flow builder 2344 may interface with flow builder engine 2302 located in the central system to build and execute the flows. Flow builder engine 2302 may interface with templates database 2346 and components database 2350 to retrieve templates or individual components for flow builder 2344. The central system may further include a metadata object 2348. Metadata object 2348 may be used as the runtime configuration for a flow generated in flow builder 2344. Each separate flow may be tied to a new metadata object 2348. The metadata object may be a denormalized schema. Central system 2300, templates database 2346, and components database 2350 may reside fully or partially in cloud computing system 2332. Alternatively, central system 2300, templates database 2346, and components database 2350 may reside outside cloud computing system 2332.

Cloud computing system 2332 includes an environment that delivers computing as a service, whereby shared resources, services, etc. may be provided to the client device 2360 and/or backend platform 2325. Cloud computing system 2332 may provide computation, software, data access, storage, and/or other services that do not require end-user knowledge of a physical location and configuration of a system and/or a device that delivers the services. Cloud computing system 2332 may include computing resources 2326*a-d*.

Each computing resource 2326*a-d* includes one or more personal computers, workstations, computers, server devices, or other types of computation and/or communication devices. The computing resource(s) 2326*a-d* may host backend platform 2325. The cloud resources may include compute instances executing in the computing resources 2326*a-d*. The computing resources 2326*a-d* may communicate with other computing resources 2326*a-d* via wired connections, wireless connections, or a combination of wired or wireless connections.

Computing resources 2326*a-d* may include a group of cloud resources, such as one or more applications ("APPs") 2326-1, one or more virtual machines ("VMs") 2326-2, virtualized storage ("VS") 2326-3, and one or more hypervisors ("HYPs") 2326-4.

Application 2326-1 may include one or more software applications that may be provided to or accessed by user device 2310 or the client device 2360. In an embodiment, flow builder 2344 may be executed locally on the client device 2360. Alternatively, the application 2326-1 may eliminate a need to install and execute software applications on the user device 2310 and client device 2360. The application 2326-1 may include software associated with backend platform 125 and/or any other software configured to be provided across cloud computing system 2332. The application 2326-1 may send/receive information from one or more other applications 2326-1, via the virtual machine 2326-2.

Virtual machine 2326-2 may include a software implementation of a machine (e.g., a computer) that executes programs like a physical machine. Virtual machine 2326-2 may be either a system virtual machine or a process virtual machine, depending upon the use and degree of correspondence to any real machine by virtual machine 2326-2. A system virtual machine may provide a complete system platform that supports the execution of a complete operating system (OS). A process virtual machine may execute a single program and may support a single process. The virtual machine 2326-2 may execute on behalf of a user and/or on behalf of one or more other backend platforms 2325 and may manage the infrastructure of cloud computing system 2332, such as data management, synchronization, or long-duration data transfers.

Virtualized storage 2326-3 may include one or more storage systems and/or one or more devices that use virtualization techniques within the storage systems or devices of computing resource 2326*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 2326-4 may provide hardware virtualization techniques that allow multiple operations systems (e.g., "guest operating systems") to execute concurrently on a host computer, such as computing resource 2326*a-d*. Hypervisor 2326-4 may present a virtual operating platform to the guest operating systems and may manage the execution of the guest operating systems multiple instances of a variety of operating systems and may share virtualized hardware resources.

In an embodiment, a user device 2340 may execute flow builder 2344 to build flows for executing business processes. The flow may include a master flow. The master flow may be made up of components, screens, and sub-flows. The sub-flows may be further made up of components, screens, and further sub-flows. The master flow may be a master process for executing a task. The sub-flows may be sub-processes for executing sub-tasks related to the task. The components and screens may be pre-programmed objects configured to execute operations related to the task.

For example, a master flow may be a sequential workflow made up of reusable components configured to execute business processes. The master flow may be implemented in a website, application, program, or the like. As non-limiting examples, master flows can be implemented for e-commerce websites (e.g., a website for purchasing movie tickets), HR systems (e.g., onboarding new employees), online banking (e.g., completing transactions), or the like.

Components database 2350 may store individual components or screens for building flows. The components or screens may be pre-programmed objects configured to execute operations to provide various functionalities. For example, components or screens may be configured to request input, receive input, process data, modify and update data records, create new data records, receive uploaded files, provided files for download, authenticate users, verify data, and/or the like.

Templates database 2346 may store pre-generated templates of master flows and sub-flows. The templates may be specifically generated for specific/common functionalities for common business processes implemented by various entities. For example, templates may include master and sub-flows for employee onboarding, purchasing products, applying for applications, logging into accounts, and/or the like.

The master and sub-flows may follow Single Responsibility Principle (SRP) and Separation of Concerns (SoC)

patterns, such that sub-flow should have a single responsibility, and that all its services should be narrowly aligned with that responsibility.

Flow builder 2344 may interface with flow builder engine 2302 to retrieve an existing template of a master flow. The master flow may include components, screens, and sub-flows. The master flow (an in-turn the sub-flows) of the template may be associated with a metadata object 2348. Metadata object 2348 may define the runtime configuration of the master flow of the template. Metadata object 2348 may be embodied as a Flow Session Setting custom metadata object (qsydApps_AO_Flow_Session_Setting_mdt) as shown in FIG. 7. The metadata object's 2348 schema may be denormalized to allow transactions of the simplest generic nature. The metadata object's schema may be a tuple. The metadata object may be an abstracted data model that is completely extensible.

Metadata object 2348 may be customizable and modifiable based on the master and sub-flow requirements. In particular, metadata object 2348 is customizable, deployable, packageable, and upgradeable application metadata. A metadata object 2348 defines the form of the application metadata. Reusable functionality may be built that determines the behavior based on metadata of that type. Records may be used to configure the master and sub-flows instead of settings.

As an example, an administrator may need to manipulate and influence how a flow executes once it has been deployed into production. An administrator may use flow builder 2344 to modify metadata object 2348 to manipulate the flow as described above without de-activating the master flow.

Metadata object 2348 includes multiple customizable fields with common data types. For example, the metadata 2348 may include a Boolean value, a configuration name, date-time value, date value, flow API name, number value, and text value. The data type may define the type of input accepted for the custom field. For example, for the data type for the boolean value may be a check-box, the data type for the configuration name may be text, the data type for the date-time value may be date/time, the data type for date value may be a date, the data type for flow API name may be text, the data type for the number value may be numbers between 16 and 20 and the data type for the text value may be text. The customizable fields may correspond to the data requested, received, and processed by the components or screens of the master and sub-flows. In this regard, the data requested, received, and processed by the components or screens may be customizable or modifiable.

In an embodiment, flow builder engine 2302 may activate a master flow, including components, screens, and sub-flows, in response to a request transmitted from flow builder 2344. A component in the master flow may establish a variable identifying the master flow and sub-flows. The variable may be the flow_API_Name. The variable may be used to identify metadata object 2348 tied to the master and sub-flows.

Flow builder engine 2302 may receive a modification to setting in the metadata object from flow builder 2344. Flow builder engine 2302 may propagate the modification of the setting in the metadata object to the master flow and the sub-flow based on the variable identifying the master flow and the sub-flow. The variable can be used to filter the flow session settings corresponding to the mater and sub-flows. The settings can be rules for the pre-programmed object for executing operations and the sub-flow executing the sub-task. For example, if the metadata object requires the two-factor authentication expiration period of 10 minutes. The sub-process or component configured to authenticate a user will time the user out if the user does not provide a code provided to authenticate the user within 10 minutes.

This allows an administrator to modify the runtime configuration of the master flow during the runtime of the master follow. That is, flow builder engine 2302 may propagate the updated setting in the metadata object while the master flow is active. The flow builder does not have to de-activate or restart the master flow.

As a non-limiting example, a master and sub-flows may implement two-factor authentication (2FA) to authenticate a user logging on to a system. An administrator may use flow builder 2344 to modify an expiration of the time to input an onetime passcode provided to the user. The administrator may update metadata object 2348 to change the expiration time from 10 minutes to 5 minutes. An administrator may use flow builder 2344 to navigate to setup, custom metadata types, flow session setting, and modify the associated record (2FA expiration period). By doing so, the setting of metadata object 2348 may be updated and implemented in the master and sub-flows, without having to restart the flow itself using the variable identifying the master and sub-flows. Each instance of the 2FA expiration period record in the master and sub-flows may be updated.

The master and sub-flows may require consistent design considerations and naming conventions. As a non-limiting example, the following naming conventions may be used:

| | A | B | C |
|---|---|---|---|
| 1 | Element (API) | Convention | Example |
| 2 | | | |
| 3 | Screen | Suffix => _UI | Client_Details_UI |
| 4 | Decision | Suffix => _LOGIC | Show_Debug_LOGIC |
| 5 | Decision Outcomes | Suffix => _OUTCOME | Yes_2FA_OUTCOME |
| 6 | Assignment | Suffix => _ASSIGNMENT | Person_Details_ASSIGNMENT |
| 7 | Data | Suffix => _DATA | Retrieve_Data_DATA |
| 8 | Resource | Suffix with type => _INPUT or _DISPLAY | First_Name_INPUT |
| 9 | Configuration variables | Suffix => _CONFIG | Show_Debug_CONFIG |
| 10 | Input/Output Variables | Suffix => _I or _O or _IO | Flow_API_Name_I |
| 11 | Picklist choice set | Suffix => _LIST | Gender_LIST |
| 12 | Picklist choice | Oject_Field_CHOICE | Person_Account_Gender_CHOICE |
| 13 | Subflows | Prefix => Subflow_ | Subflow_Client_Details |
| 14 | Custom Label Formulas | Suffix => _LABEL | Get_Object_Name_LABEL |
| 15 | Custom Components | Suffix => _CMP | Get_Object_Name_CMP |

Figure 24:
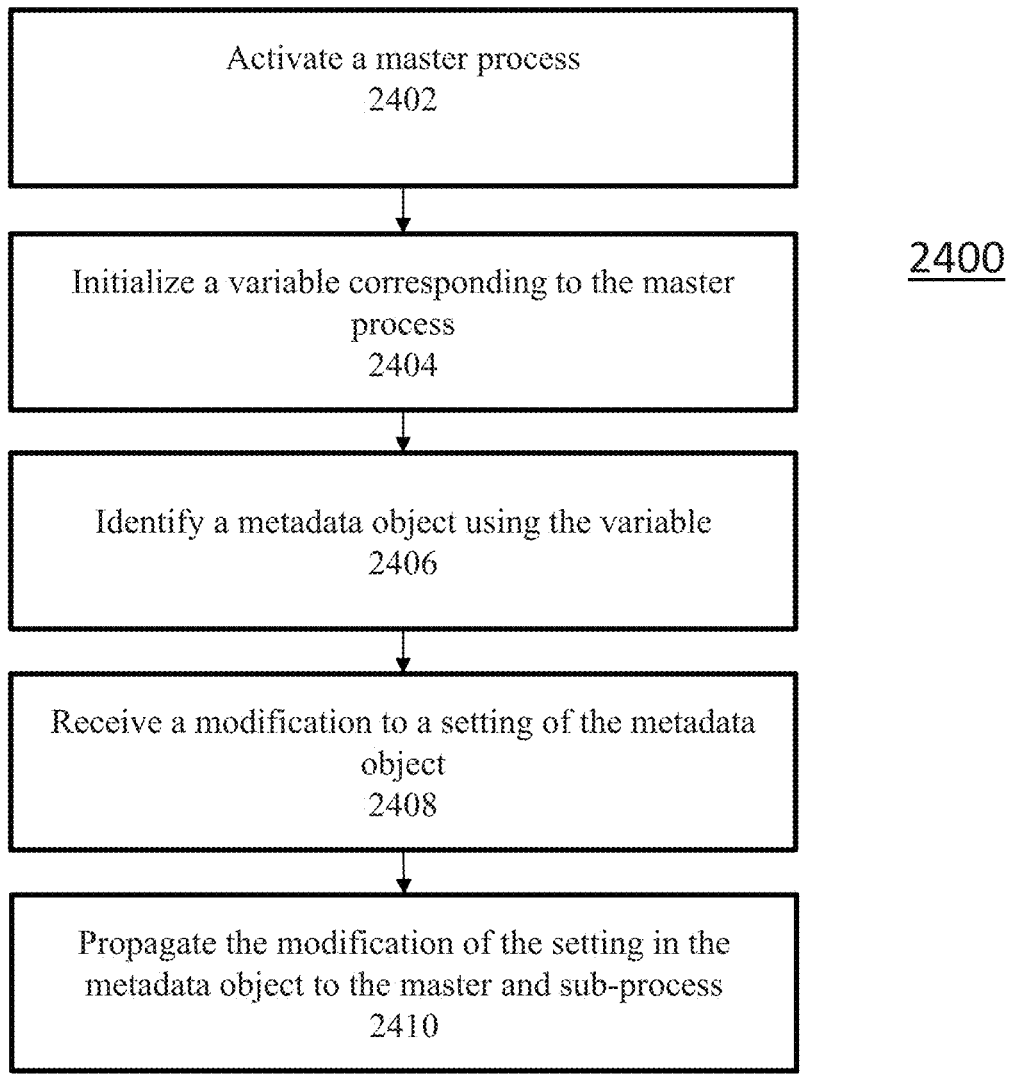
FIG. 24 is a flowchart illustrating the process of propagating changes to a metadata object of a flow during the runtime of the flow to an example embodiment.

FIG. 24 is an example flowchart 2400 for propagating changes to a metadata object in flows. Method 2400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 24, as will be understood by a person of ordinary skill in the art.

Method 2400 shall be described with reference to FIG. 23. However, method 2400 is not limited to that example embodiment.

In operation 2402, a flow builder engine activates a master process, including a sub-process and pre-programmed object. The master process may be a master flow, and the sub-process can be a sub-flow. The master process may be configured to execute a task using the sub-process and pre-programmed object. The pre-programmed object may be configured to execute operations related to the task. The operations may include retrieving data, receiving data, storing data, prompting users to receive input, rendering interfaces, or the like. The sub-process may be configured to execute sub-tasks related to the task. The sub-process may further include pre-programmed objects to execute the sub-tasks. As an example, the master process may call the sub-process to execute a sub-task. The sub-process may execute the sub-task and return output variables. The pre-programmed object may execute operations using the output variables returned by the sub-flow.

In operation 2404, the flow builder engine initializes a variable corresponding to the master process. The variable can be Flow_Session_API. The variable can be set at the Initial Data Assignment component at the start of the master process. For example, if the master process defines a process for Employee On-boarding. The variable name can be Employee_Onboarding_Flow.

In operation 2406, the flow builder engine identifies a metadata object using the variable. The metadata object is a denormalized schema. The metadata object may include flow session settings that define a runtime configuration of the master and sub-process. The variable can be used to filter the flow session settings corresponding to the mater and sub-process. The settings can be rules for the pre-programmed object for executing operations and the sub-process executing the sub-task. For example, if the metadata object requires the two-factor authentication expiration period of 10 minutes. The sub-process or component configured to authenticate a user will time the user out if the user does not provide a code provided to authenticate the user within 10 minutes.

In operation 2408, the flow builder engine receives a modification to a setting of the metadata object. As described above, the metadata object includes rules the pre-programmed object for executing operations and the sub-process executing the sub-task. The modification can be related to one of the rules. For example, the modification can be reducing the two-factor authentication expiration period from 10 minutes to 5 minutes.

In operation 2410, the flow builder engine propagates the modification of the setting in the metadata object to the master and sub-process. The pre-programmed object and sub-flow can execute the operations and sub-task based on the metadata object, including the modified setting. For example, in the event, the modification is reducing the two-factor authentication expiration period from 10 minutes to 4 minutes. In response to the modification, the sub-flow configured to execute the sub-task or component configured to authenticate the user will time the user out if the user does not provide a code provided to authenticate the user within 5 minutes.

Figure 25:
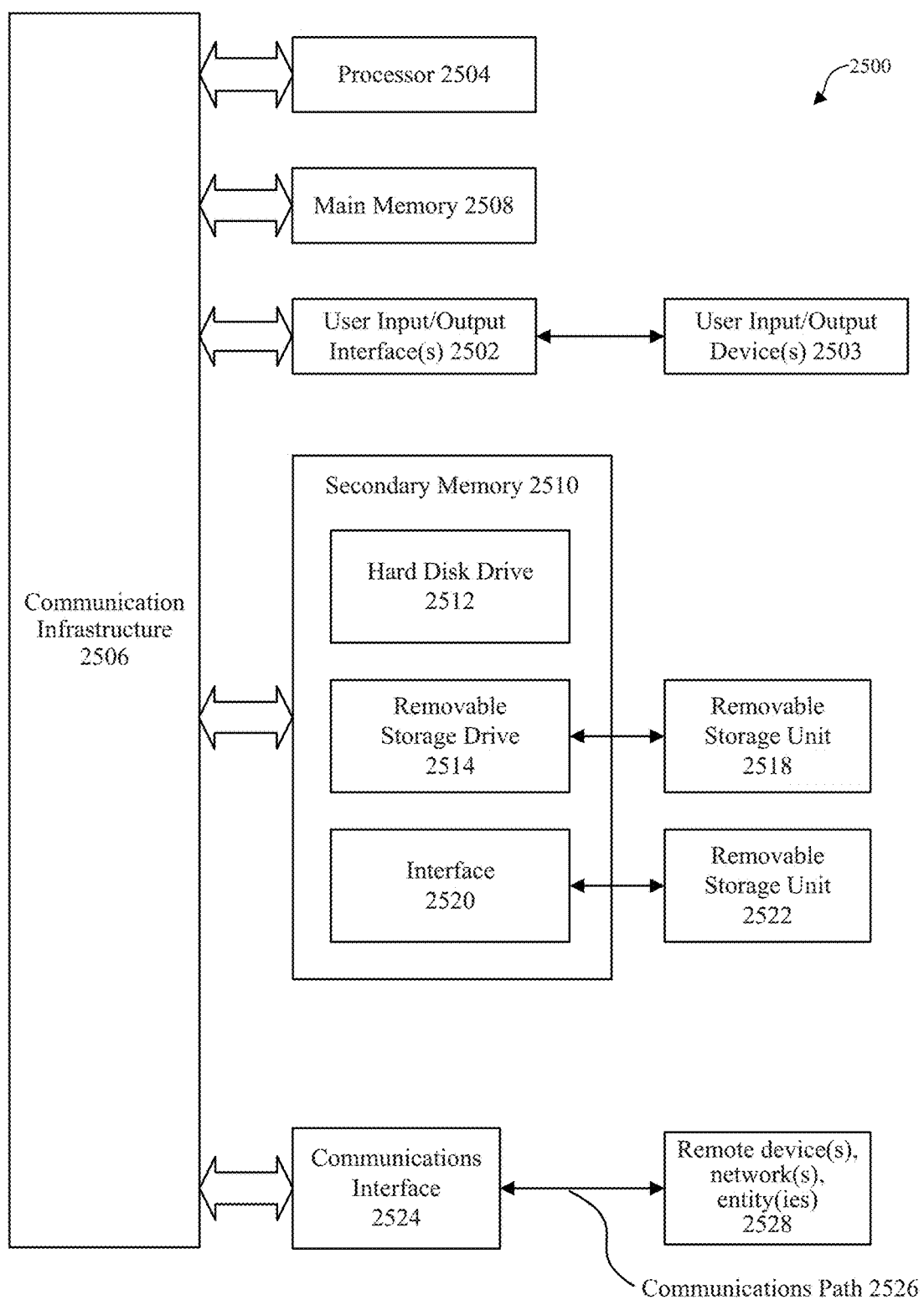
FIG. 25 is a block diagram of example components of a computing system according to an embodiment.

FIG. 25 is a block diagram of example components of device 2500. One or more computer systems 2500 may be used, for example, to implement any of the embodiments discussed herein, as well as combinations and sub-combinations thereof. Computer system 2500 may include one or more processors (also called central processing units, or CPUs), such as a processor 2504. Processor 2504 may be connected to a communication infrastructure or bus 2506.

Computer system 2500 may also include user input/output device(s) 2503, such as monitors, keyboards, pointing devices, etc., which may communicate with communication infrastructure 2506 through user input/output interface(s) 2502.

One or more of processors 2504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2500 may also include a main or primary memory 308, such as random access memory (RAM). Main memory 2508 may include one or more levels of cache. Main memory 308 may have stored therein control logic (i.e., computer software) and/or data.

Computer system 22500 may also include one or more secondary storage devices or memory 2510. Secondary memory 2510 may include, for example, a hard disk drive 2512 and/or a removable storage device or drive 2514.

Removable storage drive 2514 may interact with a removable storage unit 2518. Removable storage unit 2518 may include a computer usable or readable storage device having stored thereon computer software (control logic) and/or data. Removable storage unit 2518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 2514 may read from and/or write to removable storage unit 2518.

Secondary memory 2510 may include other means, devices, components, instrumentalities or other approaches for allowing computer programs and/or other instructions and/or data to be accessed by computer system 2500. Such means, devices, components, instrumentalities or other approaches may include, for example, a removable storage unit 2522 and an interface 2520. Examples of the removable storage unit 2522 and the interface 2520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2500 may further include a communication or network interface 2524. Communication interface 2524 may enable computer system 2500 to communicate and interact with any combination of external devices, external networks, external entities, etc. (individually and collectively referenced by reference number 2528). For example, communication interface 2524 may allow computer system 2500 to communicate with external or remote devices 2528 over communications path 2526, which may be wired and/or wireless (or a combination thereof), and which may include any combination of LANs, WANs, the Internet, etc. Control logic and/or data may be transmitted to and from computer system 2500 via communication path 2526.

Computer system 2500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 2500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2500, main memory 2508, secondary memory 2510, and removable storage units 2518 and 2522, as well as tangible articles of manufacture embodying any combination of the foregoing. Such control logic, when executed by one or more data processing devices (such as computer system 2500), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A computer-implemented method, comprising:
   activating, by one or more computing devices, a master process including a sub-process and a pre-programmed object, wherein the master process is configured to execute a task using the sub-process and pre-programmed object;
   initializing, by the one or more computing devices, a variable corresponding to the master process;
   identifying, by the one or more computing devices, a metadata object using the variable, wherein the metadata object is a denormalized schema comprising a plurality of settings defining a runtime configuration of the master process;
   configuring, by the one or more computing devices, the master process to query the metadata object at runtime in order to retrieve one or more settings of the plurality of settings;
   receiving, by the one or more computing devices, a modification to a setting of the plurality of settings of the metadata object; and
   propagating, by the one or more computing devices, the modification of the setting in the metadata object to the master process and sub-process.

2. The method of claim 1, further comprising storing, by the one or more computing devices, input received during the master process and sub-process in a record corresponding to the master process.

3. The method of claim 2, further comprising:
   retrieving, by the one or more computing devices, the record using a record identifier; and
   executing, by the one or more computing devices, an operation of the pre-programmed object using the input stored in the record.

4. The method of claim 1, further comprising executing, by the one or more computing devices, an operation of the pre-programmed object based on the metadata object including the modified setting.

5. The method of claim 1, further comprising identifying, by the one or more computing devices, the setting in the metadata object using the variable.

6. The method of claim 1, wherein the modification of the setting in the metadata object is propagated to the master process and sub-process while the master process is active.

7. A system comprising:
   a memory; and
   a processor coupled to the memory, the processor configured to:
   activate a master process including a sub-process and a pre-programmed object, wherein the master process is configured to execute a task using the sub-process and pre-programmed object;
   initialize a variable corresponding to the master process;
   identify a metadata object using the variable, wherein the metadata object is a denormalized schema comprising a plurality of settings defining a runtime configuration of the master process;

configure the master process to query the metadata object at runtime in order to retrieve one or more settings of the plurality of settings;

receive a modification to a setting of the plurality of settings of the metadata object; and propagate the modification of the setting in the metadata object to the master process and sub-process.

8. The system of claim 7, the processor further configured to store input received during the master process and sub-process in a record corresponding to the master process.

9. The system of claim 8, the processor further configured to:

retrieve the record using a record identifier; and execute an operation of the pre-programmed object using the input stored in the record.

10. The system of claim 7, the processor further configured to execute an operation of the pre-programmed object based on the metadata object including the modified setting.

11. The system of claim 7, the processor further configured to identify the setting in the metadata object using the variable.

12. The system of claim 7, wherein the modification of the setting in the metadata object is propagated to the master process and sub-process while the master process is active.

13. A non-transitory computer-readable medium having instructions stored thereon, execution of which, by one or more processors of a device, cause the one or more processors to perform operations comprising:

activating a master process including a sub-process and a pre-programmed object, wherein the master process is configured to execute a task using the sub-process and pre-programmed object;

initializing a variable corresponding to the master process;

identifying a metadata object using the variable, wherein the metadata object is a denormalized schema comprising a plurality of settings defining a runtime configuration of the master process;

configuring the master process to query the metadata object at runtime in order to retrieve one or more settings of the plurality of settings;

receiving a modification to a setting of the plurality of settings of the metadata object; and propagating the modification of the setting in the metadata object to the master process and sub-process.

14. The non-transitory computer-readable medium of claim 13, the operations further comprising storing input received during the master process and sub-process in a record corresponding to the master process.

15. The non-transitory computer-readable medium of claim 14, the operations further comprising:

retrieving the record using a record identifier; and executing an operation of the pre-programmed object using the input stored in the record.

16. The non-transitory computer-readable medium of claim 13, the operations further comprising executing an operation of the pre-programmed object based on the metadata object including the modified setting.

17. The non-transitory computer-readable medium of claim 13, the operations further comprising identifying the setting in the metadata object using the variable.

18. The non-transitory computer-readable medium of claim 13, wherein the modification of the setting in the metadata object is propagated to the master process and sub-process while the master process is active.

* * * * *